United States Patent
Wai

(10) Patent No.: US 10,210,547 B1
(45) Date of Patent: Feb. 19, 2019

(54) PREDICTIVE RECOMMENDATION SYSTEM USING CONTEXTUAL RELEVANCE

(71) Applicant: Groupon, Inc., Chicago, IL (US)

(72) Inventor: Lawrence Lee Wai, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 689 days.

(21) Appl. No.: 14/231,222

(22) Filed: Mar. 31, 2014

Related U.S. Application Data

(60) Provisional application No. 61/908,599, filed on Nov. 25, 2013, provisional application No. 61/921,310, filed on Dec. 27, 2013.

(51) Int. Cl.
  *G06Q 30/02* (2012.01)
(52) U.S. Cl.
  CPC ..... *G06Q 30/0269* (2013.01); *G06Q 30/0251* (2013.01)
(58) Field of Classification Search
  CPC .......................... G06Q 30/02; G06Q 30/0251
  USPC ........................................................... 705/14
  See application file for complete search history.

(56) References Cited

U.S. PATENT DOCUMENTS

| | | |
|---|---|---|
| 2004/0267612 A1 | 12/2004 | Veach |
| 2005/0021397 A1 | 1/2005 | Cui et al. |
| 2005/0096979 A1 | 5/2005 | Koningstein |
| 2005/0125401 A1* | 6/2005 | Carr ....................... G06Q 30/02 |
| 2006/0212350 A1 | 9/2006 | Ellis et al. |
| 2007/0078717 A1 | 4/2007 | Ho et al. |
| 2008/0103887 A1 | 5/2008 | Oldham et al. |
| 2008/0255953 A1 | 10/2008 | Chang et al. |
| 2010/0094710 A1* | 4/2010 | Ramakrishna ......... G06Q 30/02 705/14.64 |
| 2010/0121696 A1* | 5/2010 | Green .................... G06Q 30/02 705/14.13 |
| 2011/0125573 A1 | 5/2011 | Yonezaki et al. |
| 2011/0191315 A1 | 8/2011 | Neumeyer et al. |

(Continued)

OTHER PUBLICATIONS

U.S. Appl. No. 13/929,977, filed Jun. 28, 2013.

*Primary Examiner* — Vincent M Cao
(74) *Attorney, Agent, or Firm* — Alston & Bird LLP

(57) ABSTRACT

In general, embodiments of the present invention provide systems, methods and computer readable media for ranking promotions selected for recommendation to consumers based on predictions of promotion performance and consumer behavior. In embodiments, a set of promotions to be recommended to a consumer can be sorted and/or ranked according to respective relevance scores representing a probability that the consumer's behavior in response to the promotion will match a ranking target. In embodiments, calculating scores is based on a relevance model (a predictive function) derived from one or more contextual data sources representing attributes of promotions and consumer behavior. In embodiments, an absolute relevance score represents an absolute prediction of a ranking target variable. In embodiments, absolute relevance may be used to determine personalized local merchant discovery frontiers; featured result set thresholding for impressions; and/or promotion notification triggers. In embodiments, predictive models based on gross revenue may be optimized using promotion category-dependent price boosting.

22 Claims, 20 Drawing Sheets

(56) References Cited

U.S. PATENT DOCUMENTS

| | | | |
|---|---|---|---|
| 2012/0023043 A1* | 1/2012 | Cetin | G06N 7/005 706/12 |
| 2012/0215617 A1 | 8/2012 | Shah et al. | |
| 2012/0259702 A1 | 10/2012 | Zhang et al. | |
| 2012/0290382 A1 | 11/2012 | Martin et al. | |

* cited by examiner

1300 deal A (rank 1):
predicted conversion probability = 1.2% deal B (rank 2):
predicted conversion probability = 0.7% deal C (rank 3):
predicted conversion probability = 0.4%

...

deal P (rank 16):
predicted conversion probability = 0.3% deal Q (rank 17):
predicted conversion probability = 0.2% below threshold
(don't show)

deal R (rank 18):
predicted conversion probability = 0.1%

PREDICTIVE RECOMMENDATION SYSTEM USING CONTEXTUAL RELEVANCE

CROSS-REFERENCE TO RELATED APPLICATIONS

This application claims the benefit of U.S. Provisional Application No. 61/908,599, entitled "PREDICTIVE RECOMMENDATION SYSTEM USING CONTEXTUAL RELEVANCE," filed Nov. 25, 2013, and of U.S. Provisional Application No. 61/921,310, entitled "METHOD AND SYSTEM FOR PROVIDING IMPRESSIONS USING ABSOLUTE RELEVANCE," filed Dec. 27, 2013, the entire contents of which are hereby incorporated by reference.

This application is related to the following concurrently filed, co-pending, and commonly assigned applications: U.S. Application Ser. No. 14/231,362, filed Mar. 31, 2014, entitled "PREDICTIVE RECOMMENDATION SYSTEM USING ABSOLUTE RELEVANCE," and U.S. Application Ser. No. 14/231,385, filed Mar. 31, 2014, entitled "PREDICTIVE RECOMMENDATION SYSTEM USING PRICE BOOSTING," all listing Lawrence Lee Wai as inventor.

FIELD

Embodiments of the invention relate, generally, to a predictive recommendation system using predictive models generated from relevance data sources.

BACKGROUND

Current methods for recommending promotions to consumers for purchase exhibit a plurality of problems that make current systems insufficient, ineffective and/or the like. Through applied effort, ingenuity, and innovation, solutions to improve such methods have been realized and are described in connection with embodiments of the present invention.

SUMMARY

The capability to recommend promotions for purchase that are most relevant to each consumer is important for a promotion and marketing service, because maintaining an active and engaged customer base means maximizing profits. In some embodiments, a relevance system is used to select promotions to be recommended to a consumer (i.e., the available promotions that are most relevant to the consumer) based on using stored data representing attributes of promotions and/or the consumer, and is performed by executing a workflow that specifies a sequence of filtering rules and/or algorithms to be applied in selecting the relevant promotions.

As such, and according to some example embodiments, the systems and methods described herein are therefore configured to rank promotions selected for recommendation to consumers based on predictions of promotion performance and consumer behavior. The top-ranked promotions may be featured in a presentation to the consumer.

In some embodiments, each of a set of available promotions to be recommended to a particular consumer can be sorted and/or ranked according to a probability that the consumer's behavior in response to the promotion will match a ranking target (e.g., conversion rate, gross revenue). In some embodiments, promotions available to a consumer are ranked based on a relevance model derived from one or more data sources representing attributes of promotions and consumer behavior. Using the model, each promotion is associated with a relevance score that represents the probability that the consumer's behavior with respect to the promotion will approach the ranking target while the consumer interacts with an impression containing content describing the promotion. In some embodiments, the set of promotions selected for recommendation to a consumer can be sorted and/or ranked based on their respective associated relevance scores.

In embodiments, the relevance model may be a predictive function. In some embodiments, the predictive function may be a trainable function that is developed using machine learning. In some embodiments, the predictive function may be generated offline using supervised learning in a set of modeling stages in which the function is adapted based on training data sets of features that are extracted from a set of data sources (e.g., log data, promotion and user attribute data). In some embodiments, the set of data sources includes contextual data sources. In embodiments, examples of contextual data sources for mobile consumers may include user locations (prior, current, or potential) and their associated categories of interest; prior promotion interest level shown by the consumer; and prior promotion subcategory interest level.

Recommendation engines are significantly different from search engines in that the consumer expects that the returned recommendations should be relevant in an absolute sense. In embodiments, absolute relevance can be defined as an absolute prediction of a ranking target variable, e.g., the probability that the consumer will purchase a particular promotion, or the probability that the consumer will click on content within an impression that represents a particular promotion. In some embodiments, calculating absolute relevance may include optimizing the promotion discovery region selection for promotions local to a consumer. In some embodiments, absolute relevance may be used to determine personalized local merchant discovery frontiers for consumers, personalized featured result set thresholding for impressions shown to consumers, and/or personalized promotion notification triggers for consumers.

In embodiments, predictive models based on gross revenue (e.g., measured as bookings) may be optimized using promotion category-dependent price boosting. Each promotion relevance score, calculated based on a gross revenue model, is adjusted using a category-dependent conversion rate multiplier that is characterized by a price threshold that is used to cap the promotion price. For relevance scores calculated based on bookings per impression, the adjusted relevance score thus represents an estimated minimum quantity of bookings per impression for the promotion. In some embodiments, price boosting optimization using the conversion rate multiplier is only applied to relevance scoring of promotions available to highly engaged consumers.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 13 illustrates an example of featured result set thresholding using absolute relevance in accordance with some embodiments discussed herein;

DETAILED DESCRIPTION

Figure 1:
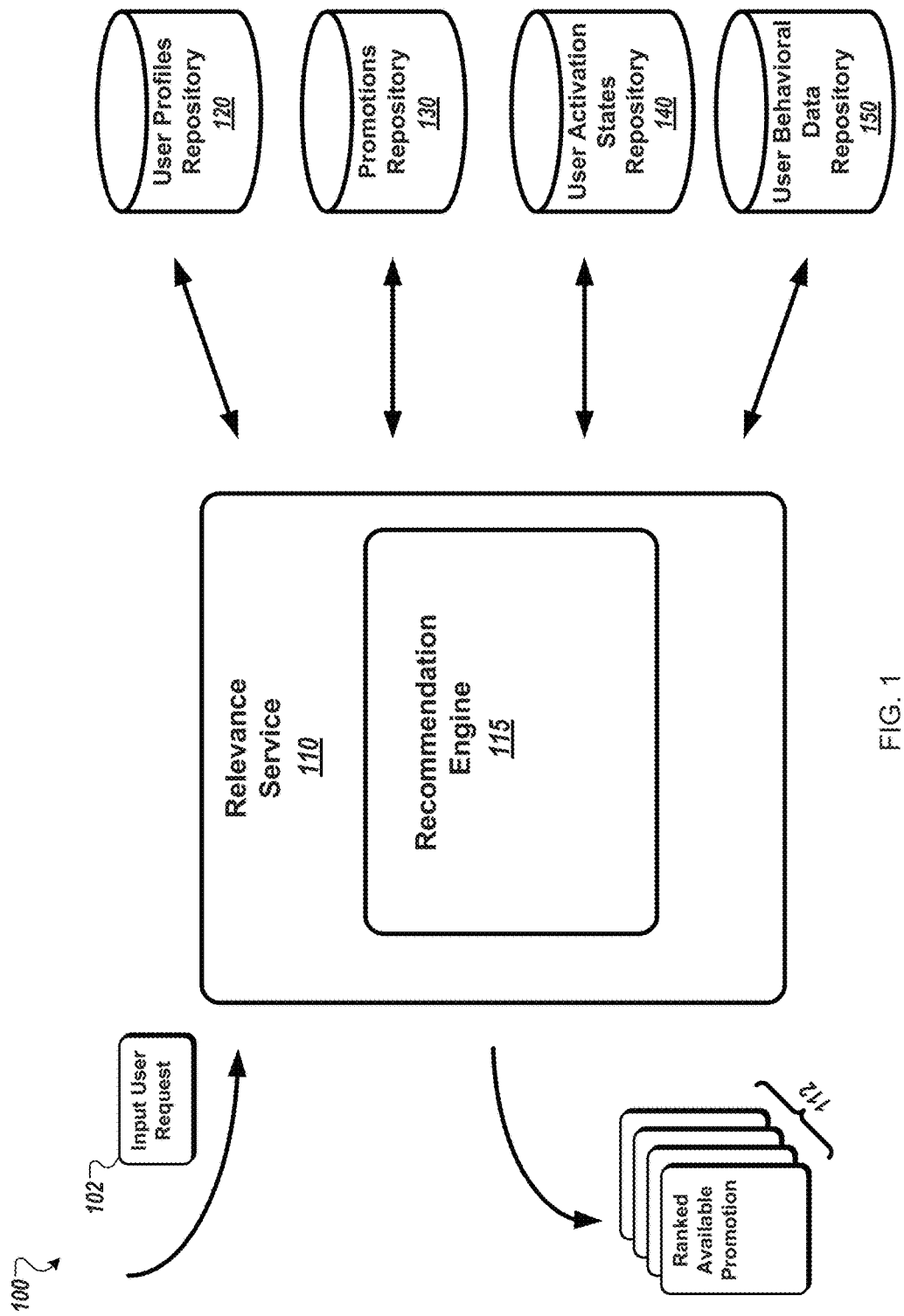
FIG. 1 illustrates an example system that can be configured to implement the relevance ranking of promotions that are available from a promotion and marketing service and are to be recommended to a particular consumer in accordance with some embodiments discussed herein.

The present invention now will be described more fully hereinafter with reference to the accompanying drawings, in which some, but not all embodiments of the invention are shown. Indeed, this invention may be embodied in many different forms and should not be construed as being limited to the embodiments set forth herein; rather, these embodiments are provided so that this disclosure will satisfy applicable legal requirements Like numbers refer to like elements throughout.

As described herein, system components can be communicatively coupled to one or more of each other. Though the components are described as being separate or distinct, two or more of the components may be combined into a single process or routine. The component functional descriptions provided herein including separation of responsibility for distinct functions is by way of example. Other groupings or other divisions of functional responsibilities can be made as necessary or in accordance with design preferences.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data may be received directly from the another computing device or may be received indirectly via one or more intermediary computing devices, such as, for example, one or more servers, relays, routers, network access points, base stations, and/or the like. Similarly, where a computing device is described herein to send data to another computing device, the data may be sent directly to the another computing device or may be sent indirectly via one or more intermediary computing devices, such as, for example, one or more servers, relays, routers, network access points, base stations, and/or the like.

As used herein, the term "promotion and marketing service" may refer, without limitation, to a service that is accessible via one or more computing devices and is operable to provide example promotion and/or marketing services on behalf of one or more providers that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may be used to refer, without limitation, to a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a running company that sells attire that is generally used by a person who runs or participates in athletic activities.

As used herein, the terms "promotion," "offer," "deal" and similar terms may be used interchangeably to refer, without limitation, to any type of offered, presented or otherwise indicated reward, discount, coupon, credit, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

As used herein, the term "instrument" may be used, without limitation, to refer to any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned running company as the example provider, an electronic indication in a mobile application that shows $50 of value to spend at the running company. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impression" may be used, without limitation, to refer to a communication, a display, or other perceived indication, such as a flyer, print media, e-mail, text message, application alert, mobile applications, other type of electronic interface or distribution channel and/or the like, of one or more promotions. For example, and using the aforementioned running company as the example provider, an e-mail communication sent to consumers that indicates the availability of a $25 for $50 toward running shoes promotion.

As used herein, the terms "consumer" and "customer" may be used interchangeably to refer, without limitation, to a client, customer, purchaser, shopper, user or the like who may be in the position to or does exchange value for one or more instruments under the terms defined by the one or promotions. For example, and using the aforementioned running company as the example provider, an individual who is interested in purchasing running shoes.

FIG. 1 illustrates an example system 100 that can be configured to implement the relevance ranking of promotions that are available from a promotion and marketing service and are to be recommended to a particular consumer (i.e., "user"). System 100 comprises a relevance service 110 that returns a set of available promotions 112 that are ranked for relevance to a consumer in response to receiving a request 102 for available promotions on behalf of the consumer; a user profiles repository 120 in which data representing profile attributes of consumers are stored; a promotions repository 130 in which data representing attributes of promotions are stored; a user activation states repository 140 in which data representing consumer activation states respectively associated with consumers are stored; and a user behavioral data repository 150 in which historical data representing the respective consumer behavior of consumers are stored. The relevance service 110 includes a recommendation engine 115 that is configured to select available promotions to be recommended to a particular consumer.

In some embodiments, recommendation engine 115 generates a set of available promotions that are most relevant to a consumer in response to receiving consumer identification data representing the consumer. In some embodiments, generating the set of available promotions includes selecting the promotions using stored data representing attributes of promotions and/or the consumer, and is performed by executing a workflow that specifies a sequence of filtering rules and/or algorithms to be applied in selecting the relevant promotions. A workflow may include ranking the selected promotions for relevance to the consumer and then ordering the selected promotions based on their respective rankings. In some embodiments, the most highly ranked promotions may be presented to the consumer as featured recommended promotions.

Figure 2:
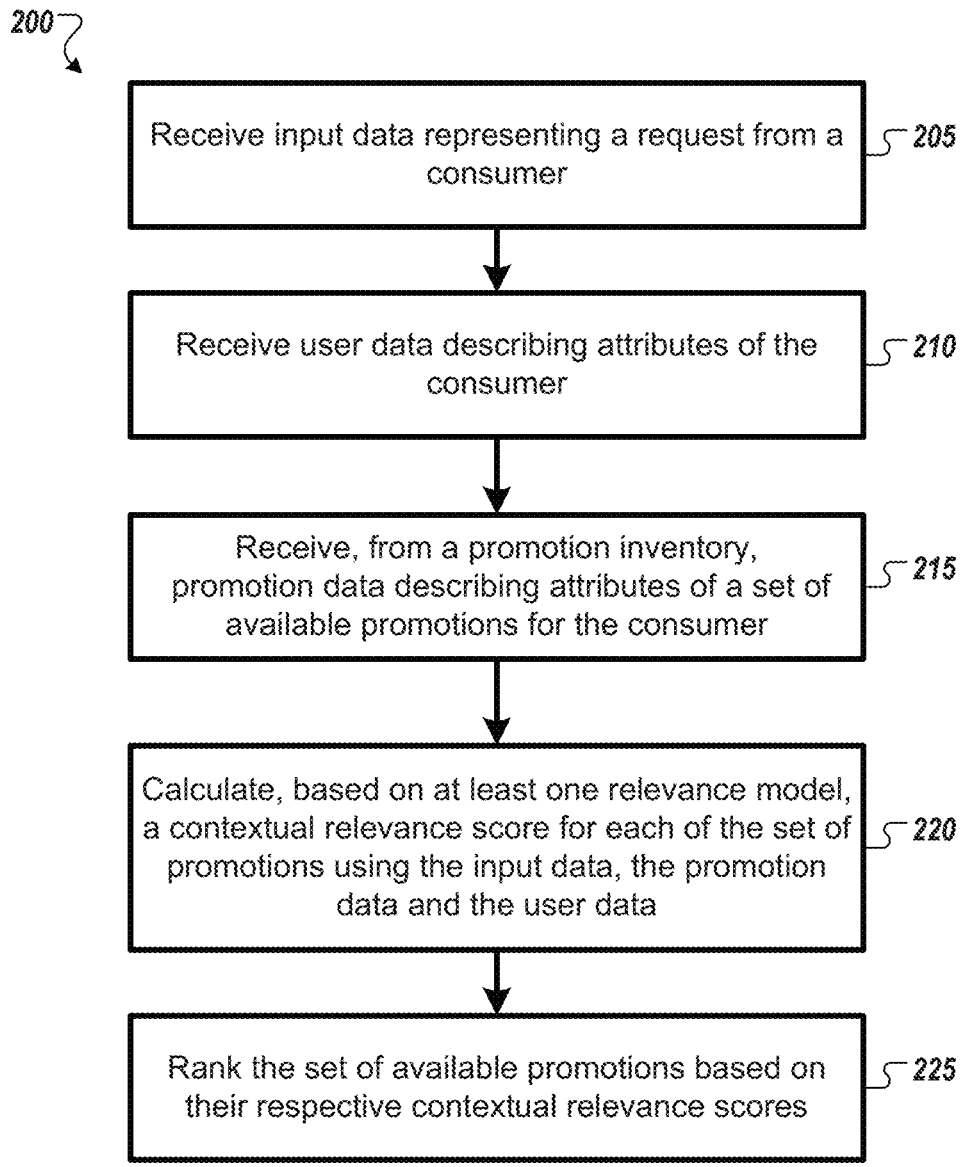
FIG. 2 is a flow diagram of an example method for generating and ranking a set of promotions to be recommended to a consumer in accordance with some embodiments discussed herein.

FIG. 2 is a flow diagram of an example method 200 for generating and ranking a set of promotions to be recommended to a consumer. For convenience, the method 200 will be described with respect to a system, including one or more computing devices, that performs the method 200. Specifically, the method 200 will be described with respect to its implementation by recommendation engine 115 in system 100.

In embodiments, the system receives 205 input data representing a request from a consumer. The input data can include consumer identification data. In some embodiments, for example, the consumer identification data may include a unique consumer identifier (e.g., a login identifier that is provided by a consumer when the consumer interacts with the content) and/or at least one consumer-associated bcookie, which is a unique identifier of a device (e.g., a mobile phone, a tablet, or a personal computer) and/or a mobile application or browser from which the consumer accesses the content. Identifying a consumer through associated bcookies ensures that a wider variety of behavioral data may be collected from the consumer since not all types of consumer access to content require the consumer to first provide a unique identifier.

In embodiments, the system receives 210 user data describing attributes of the consumer. In some embodiments, the user data may include historical data representing the consumer's previous consumer behavior as described, for example, in U.S. patent application Ser. No. 13/929,977 entitled "Predictive Recommendation System," filed on Jun. 28, 2013, and which is incorporated herein in its entirety. In some embodiments, the behavioral data that is collected from a particular consumer can be associated with that consumer's identification data so that a collection of multiple instances of behavior from a single consumer may be stored as history data in a consumer behavioral data repository 150. Examples of collected consumer behavioral data include instances of consumer engagement with published content (e.g., instances in which a consumer opens a mobile application, clicks on and/or opens an email, or visits a website), and consumer activation state (e.g., instances in which a consumer makes a promotion purchase).

In embodiments, the system receives 410 promotion data describing attributes of a set of promotions that currently are available to the consumer. In some embodiments, the set of available promotions are selected in response to a search query that is executed against promotions data, stored a promotions repository 130, describing attributes of promotions in a promotions inventory. In some embodiments, the promotions repository 150 may be a implemented within a search platform (e.g., open-source Apache Solr, see https://lucene.apache.org/solr/), and the search query may include a set of promotion attributes as well as consumer attributes described in the received input data and/or the received user data. Additionally and/or alternatively, in some embodiments, the set of promotions may be selected by executing a sequence of filtering rules and/or algorithms that are applied to one or a combination of the promotions data, the input data, and/or the user data.

In embodiments, the system calculates 220 a contextual relevance score for each of the set of available promotions. In some embodiments, the system calculates the contextual relevance score for each available promotion using one or a combination of the input data, the promotion data, and the user data and based on at least one relevance model derived from a set of contextual data sources. In embodiments, the contextual relevance score represents a predicted probability that the consumer will purchase the promotion if the promotion is included in the content of an impression distributed to the consumer. The contextual data sources, relevance models, and contextual relevance scores will be discussed in detail below with reference to FIGS. 3-8.

In embodiments, the system ranks 225 the set of available promotions based on their respective contextual relevance scores using a relevance model. In some embodiments, each of a set of available promotions to be recommended to a particular consumer can be ranked, based on data representing the promotion's performance and the consumer's behavior, according to a probability that the consumer's behavior in response to the promotion will match a ranking target. Ranking targets will be discussed in detail below with reference to FIGS. 5-8.

In some embodiments, each promotion is represented by a feature vector that includes feature data representing attributes of the promotion and attributes of the consumer. In some embodiments, the feature data elements of the feature vector are selected based on the ranking target. There is a variety of well-known types of predictive functions (e.g., clustering algorithms, classifiers, neural networks, ensemble of trees), and the implementation choice of predictive function is not critical to the invention.

Figure 3:
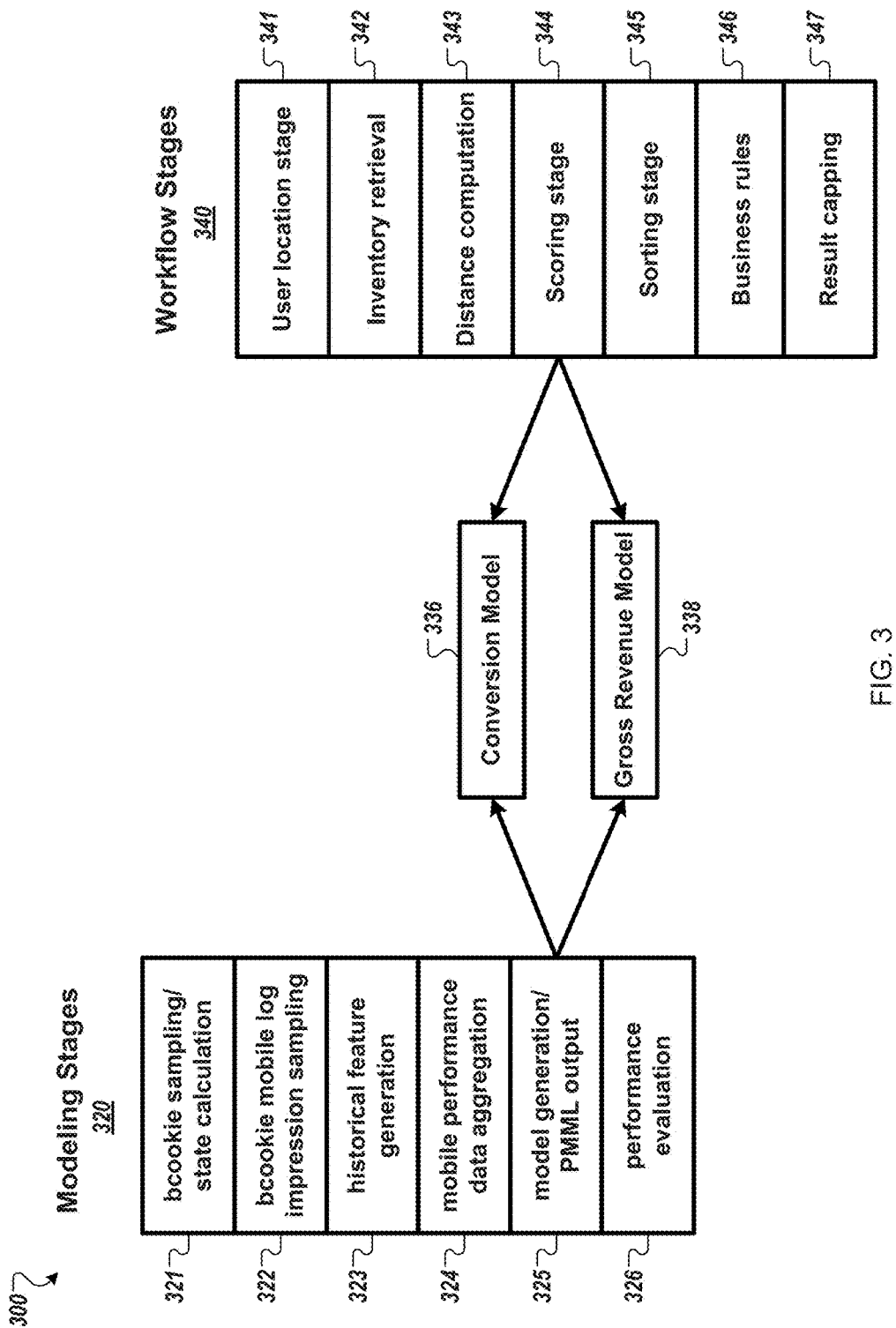
FIG. 3 is a diagram of an exemplary overview process for generating a relevance model derived from contextual data sources and, based on the model, calculating a contextual relevance score for each of a set of available promotions to a mobile consumer during a workflow in accordance with some embodiments discussed herein.

FIG. 3 is a diagram of an exemplary overview process 300 for generating a relevance model derived from contextual data sources and, based on the model, calculating a contextual relevance score for each of a set of available promotions to a mobile consumer during a workflow. Contextual mobile relevance generally refers to mobile relevance based on the context (e.g., the where/when/how/who/why) within which a request for promotions on behalf of a consumer occurs. In embodiments, examples of contextual data sources for mobile consumers may include user locations (prior, current, or potential) and their associated categories of interest; prior promotion interest level shown by the consumer; and prior promotion subcategory interest level.

In some embodiments, the relevance model can be generated offline using supervised learning. In a typical supervised learning scenario, a predictive function that maps an input value to one of a set of predefined output values is adapted, in response to exposure to a training data set containing examples of inputs and their respective associated outputs, to perform a mapping that represents a particular predictive model. In some embodiments, the predictive function maps data representing the promotion's performance and the consumer's behavior to one of a set of probability classes, each class representing a different probability that the data matches a ranking target.

In some embodiments, the predictive function may be generated offline using machine learning in a set of modeling stages 320 in which the function is adapted (e.g., in stage 325) based on a set of features that are extracted (e.g., in stages 321, 322, and 323) from a set of data sources (e.g., log data, promotion and user attribute data). In some embodiments, the set of data sources includes contextual data sources.

Figure 4:
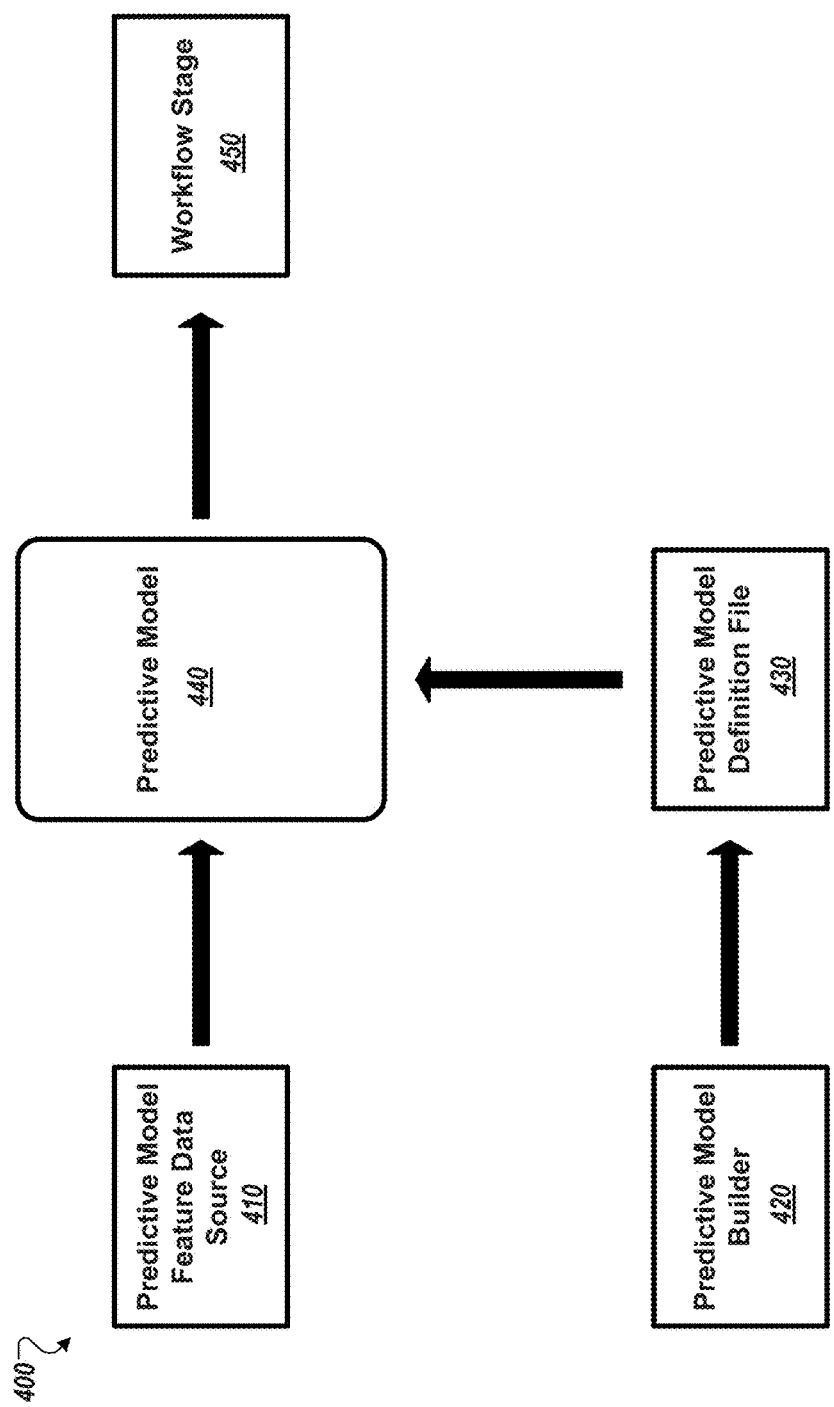
FIG. 4 is an illustration of an exemplary process 400 for generating a predictive relevance model that will be used in a workflow calculating a contextual relevance score in accordance with some embodiments discussed herein.

FIG. 4 is an illustration of an exemplary process 400 for generating a predictive relevance model that will be used in a workflow calculating a contextual relevance score. Specifically, process 400 may be implemented in the modeling stages 320 and used in one or more of the workflow stages 340 of process 300.

In embodiments, the predictive model feature data source 410 includes methods for extracting feature data values from a set of data sources received during a set of data collection stages (e.g., stages 321, 322, and 323 in FIG. 3). In embodiments in which the predictive model represents a mobile consumer, the features can include attributes of the consumer (e.g., bcookie engagement/activation state, distance from cookie to promotion); attributes of the promotion (e.g., promotion category, promotion price); and consumer behavior of a particular consumer (e.g., # impressions of the promotion for the bcookie) and/or historical behavior data collected from a sample of consumers (e.g., clicks per impression of the promotion (all bcookies).

In some embodiments, a feature set is aggregated (e.g., stage 324) to produce feature vectors to be used as input for predictive functions. Each of the feature vectors has reduced dimensionality and optimally represents the model of the ranking target associated with the predictive function. For example, in some embodiments in which the type of predictive function is an ensemble of trees, a random forest algorithm is used to produce 10 tree ensembles with a maximum of 20 nodes per tree. The random forest algorithm generates a ranking target model as output, as well as calculates the relative importance of each of the features used in the model. Extracting feature data values is discussed in further detail in U.S. patent application Ser. No. 13/929,977.

The generated predictive model (e.g., models 336 and 338 in FIG. 3) is represented by a predictive model definition file 430, which is generated by a predictive model builder 420. In embodiments, the predictive model 440, including the predictive model definition file 430 and predictive model feature data source 410, may be accessed by recommendation engine 115 for data feature extraction and calculation of a contextual relevance score during a runtime workflow stage 450 (e.g. scoring stage 344 in FIG. 3).

In some embodiments, a generated predictive model definition 430 can be represented in Predictive Model Markup Language (PMML), an industry standard language. The PMML model representation can be created from an input model configuration using a third party modeling package, such as the open-source R application (http://www.r-project.org). The resulting model representation 430 can be deployed to a variety of different systems and platforms, since PMML can be processed by any implementation of an open-source Java PMML API (jpmml, see http://www.jpmml.org). In some embodiments, a predictive model definition is JavaScript Object Notation (JASON) file that can include one or more PMML model definitions, feature definitions, a decision tree for use in selecting a model definition, and/or model definition creation information.

Figure 5:
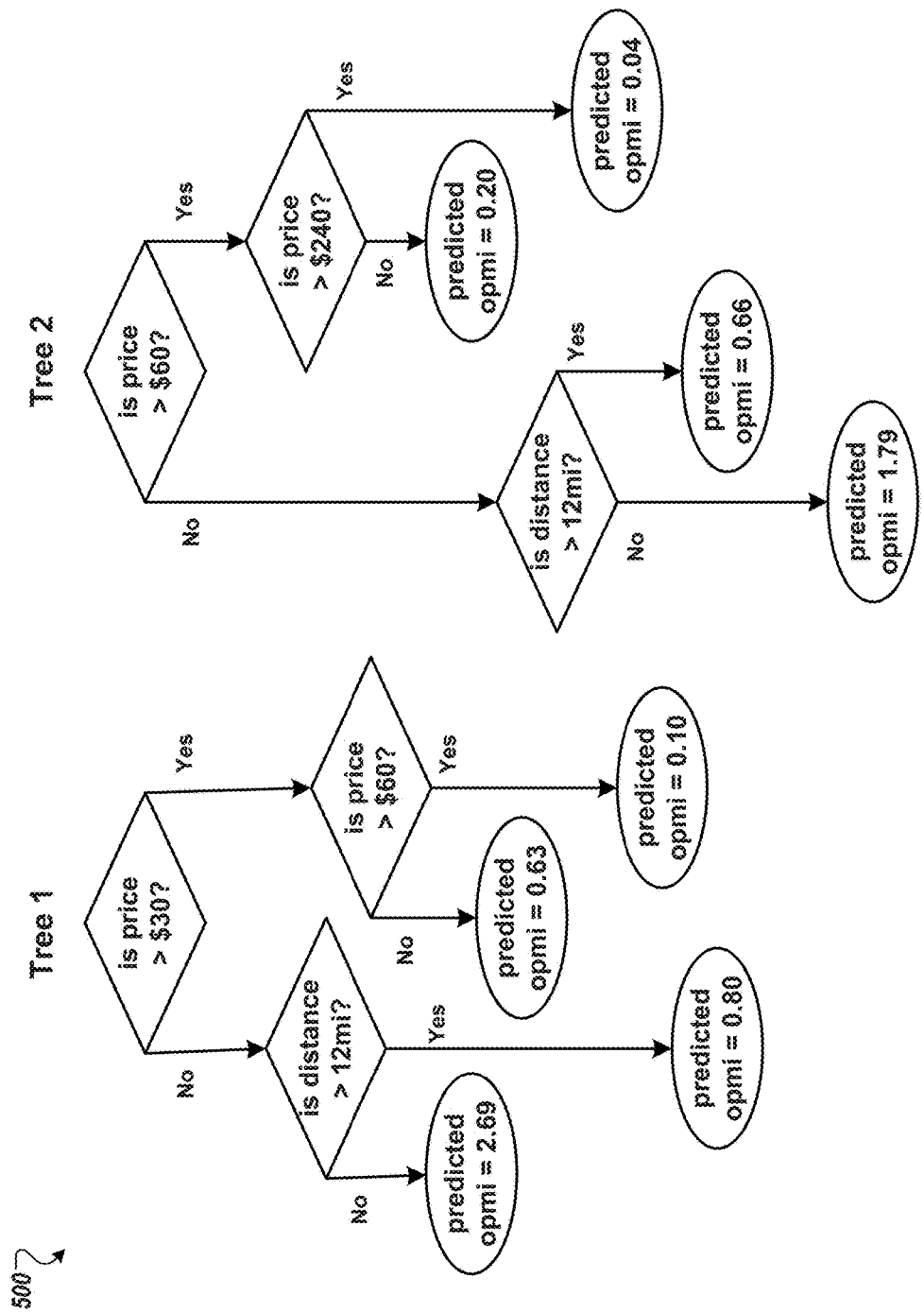
FIG. 5 illustrates an exemplary random forest predictive consumer conversion model for a ranking target of orders per thousand impressions in accordance with some embodiments discussed herein.

FIG. 5 illustrates an exemplary random forest predictive consumer conversion model 500 for a ranking target of orders per thousand impressions (opmi). The conversion model is based on two features: promotion price and promotion distance from the consumer's location, and generates an output prediction of the probability that a consumer will purchase a promotion as a result of showing the impression to the consumer.

The exemplary random forest 500 is composed of two trees, and the prediction of the random forest is the average of the predictions from the two trees. The prediction from a tree is determined by beginning at the root node decision (i.e., "is price >$30" for tree 1 and "is price >$60" for tree 2) and then traversing a logic path through the tree to a terminal leaf node based on the decision outcome determined at each successive node along the path. For example, if a promotion costs $20 and is located 8 miles away from the consumer, we would obtain a prediction of 2.69 orders per thousand impressions from traversing a logic path through tree 1, and we would obtain a prediction of 1.79 orders per thousand impressions from traversing a logic path through tree 2. The exemplary random forest prediction is the average of the respective predictions from tree 1 and tree 2, i.e. (2.69+1.79)/2=2.24 orders per thousand impressions, or a 0.224% chance of conversion.

Figure 6:
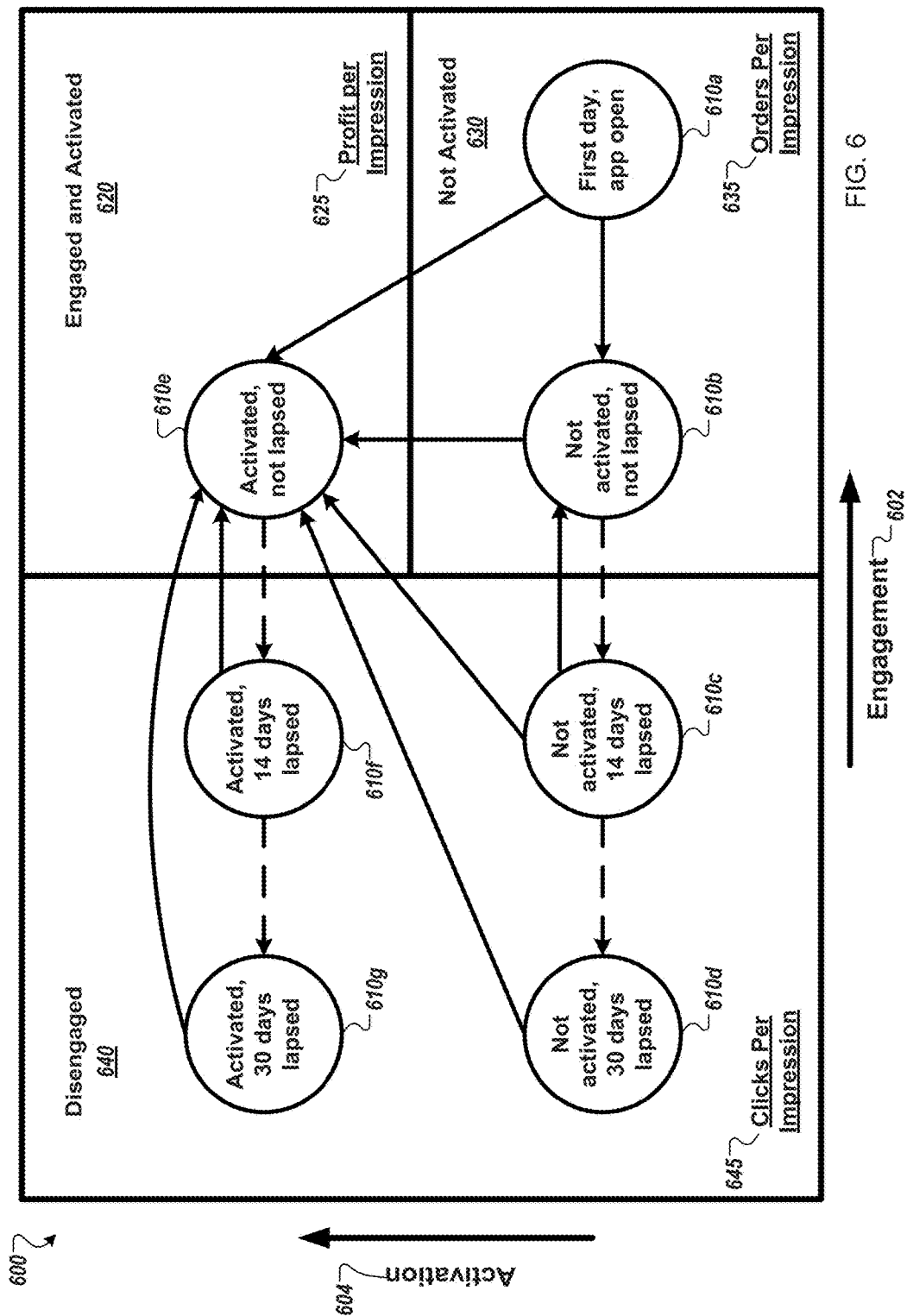
FIG. 6 illustrates an example lifecycle model of consumer interaction behavior with a mobile application that presents promotions available from a promotion and marketing service in accordance with some embodiments discussed herein.

FIG. 6 illustrates an example lifecycle model 600 of consumer interaction behavior with a mobile application ("app") that presents promotions available from a promotion and marketing service. In embodiments, a model representing states of a typical consumer lifecycle may be determined based on historical behavioral data that has been collected from a large sample of consumers. In some embodiments, each of a set of available promotions to be recommended to a particular mobile app consumer can be ranked, based on data representing the promotion's performance and the consumer's behavior, according to a probability that the consumer's behavior in response to the promotion will match a ranking target representing an increase the consumer's lifecycle model state engagement and/or activation level.

The example lifecycle model 600 includes seven consumer lifecycle model states (610*a-g*); each state represents relative levels of a consumer's engagement 602 and activation 604 while the consumer interacts with the app. The states along the bottom row (610*a-d*) have not been activated, i.e., the consumer has not made a promotion purchase while interacting with the app. The states along the top row (610*e-g*) have been activated, i.e., the consumer has made a promotion purchase while interacting with the app. In some embodiments, the level of engagement represented by a state is determined by the amount of time that has elapsed since the consumer's previous interaction with the app. The lifecycle model 600 includes three relative engagement levels: Current (i.e., no time has elapsed), as represented by states 610*a*, 610*b*, and 610*e*; Moderate (i.e., a first predetermined time window, e.g., 14 days, has elapsed); and Inactive (i.e., a second predetermined time window, e.g., 30 days, has elapsed).

As illustrated in FIG. 6, an arrow between two states represents a possible consumer sate transition that may occur during the lifecycle of a particular consumer's interactions with the app. Each solid line arrow depicts a state transition in which the relative level of consumer engagement increases or is maintained, while each dotted line arrow depicts a state transition in which the relative level of consumer engagement decreases.

As illustrated in FIG. 6, the transition to state 610*e* (activated, not lapsed) in the lifecycle model 600 potentially can occur from any of the other states (610*a-d*, 610*f-g*). In embodiments, it has been determined that, based on marketing data, a transition to state 610*e* includes increasing the relative level of consumer engagement 602. Thus, if an analysis of a particular consumer's behavior determines that a consumer is in a model state other than 610*e*, increasing the levels of engagement and/or activation of the consumer would be desirable to facilitate a transition from that model state to 610*e*. In some embodiments, a particular consumer's current lifecycle model state, determined by the consumer's past consumer behavior, can be used to determine a ranking of currently available promotions to be recommended to the consumer. The ranking may be based on a predicted probability that the consumer's interaction with information about the promotions presented in the app will result in an increase in the consumer's engagement and/or activation level and/or result in the consumer's purchase of a promotion. Thus, a lifecycle model based on consumers' past behavior can enable a promotion and marketing service to establish a positive feedback loop to optimize the overall levels of engagement and activation of current consumers.

Figure 7:
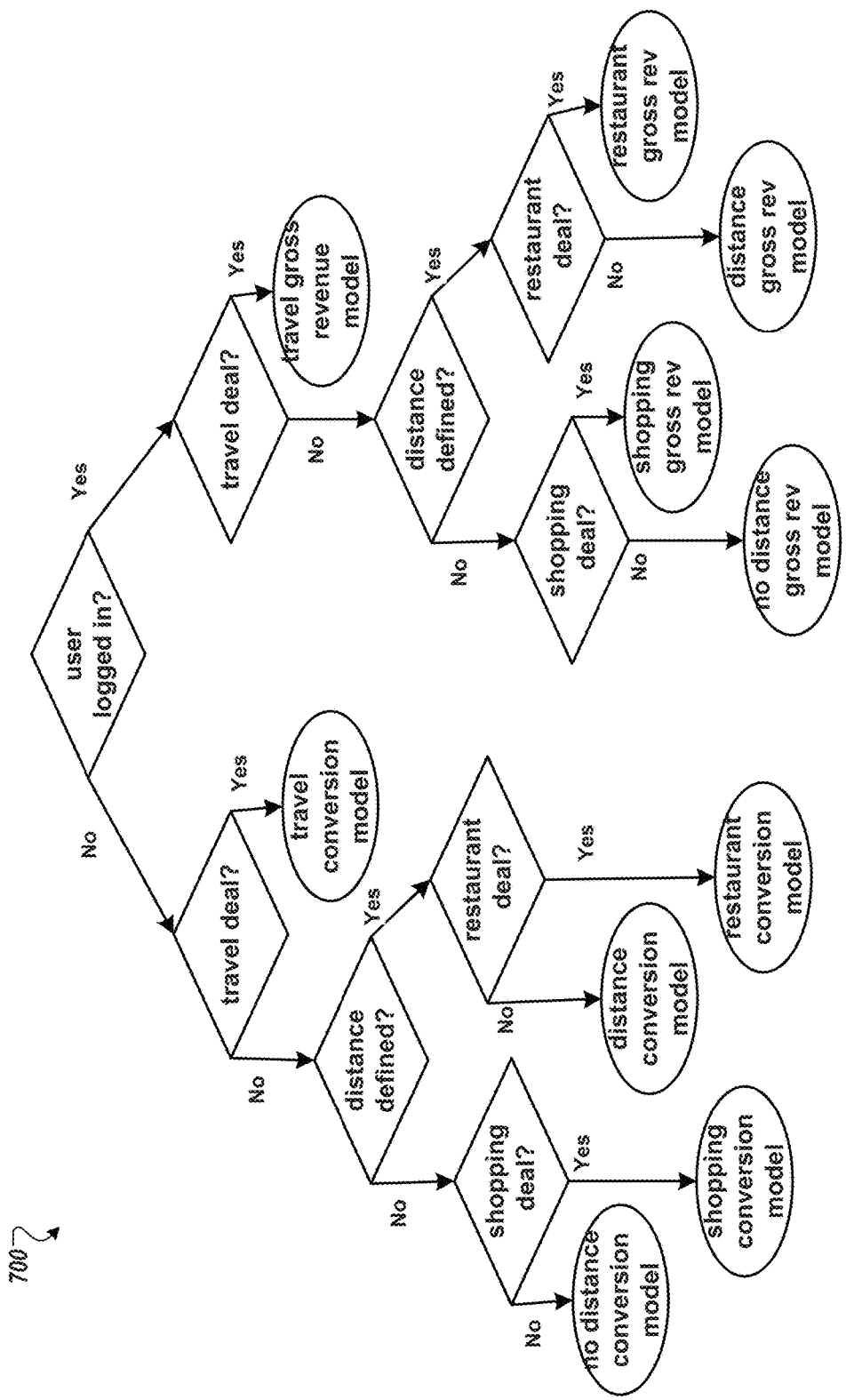
FIG. 7 illustrates the logic for an exemplary combination random forest predictive model used to calculate a contextual relevance score for a promotion to be shown in an impression to a particular consumer in accordance with some embodiments discussed herein.

FIG. 7 illustrates the logic 700 for an exemplary combination random forest predictive model used to calculate a contextual relevance score for a promotion to be shown in an impression to a particular consumer. In embodiments, a combination random forest predictive model includes multiple random forest models, each representing a different contextual data source. Adding random forest models to the overall predictive model improves the predictive capability of the overall model, because the features used as input to the model can be derived from a larger number of data sources.

For example, in embodiments, a random forest model for which logic 700 may be applied is a combination of 10 random forests, each with 10 trees. The 10 random forests consisted of 5 random forests for conversion rate (applied to not logged-in users), and 5 random forests for gross revenue rate (applied to logged-in users). The 5 random forests applied per user were as follows: travel, shopping, restaurant, other promotions with distance defined, other promotions with no distance defined. The trees were restricted to a maximum of 20 nodes; this means that for a typical consumer-promotion pair, there would be about 50 nodes computed (5 decision nodes per tree times 10 trees in the ensemble). If there were 1000 available promotions selected for the consumer from a promotion inventory, the combination random forest model would be used to compute a relevance score for each of the promotions in response to each request from the consumer.

Figure 8:
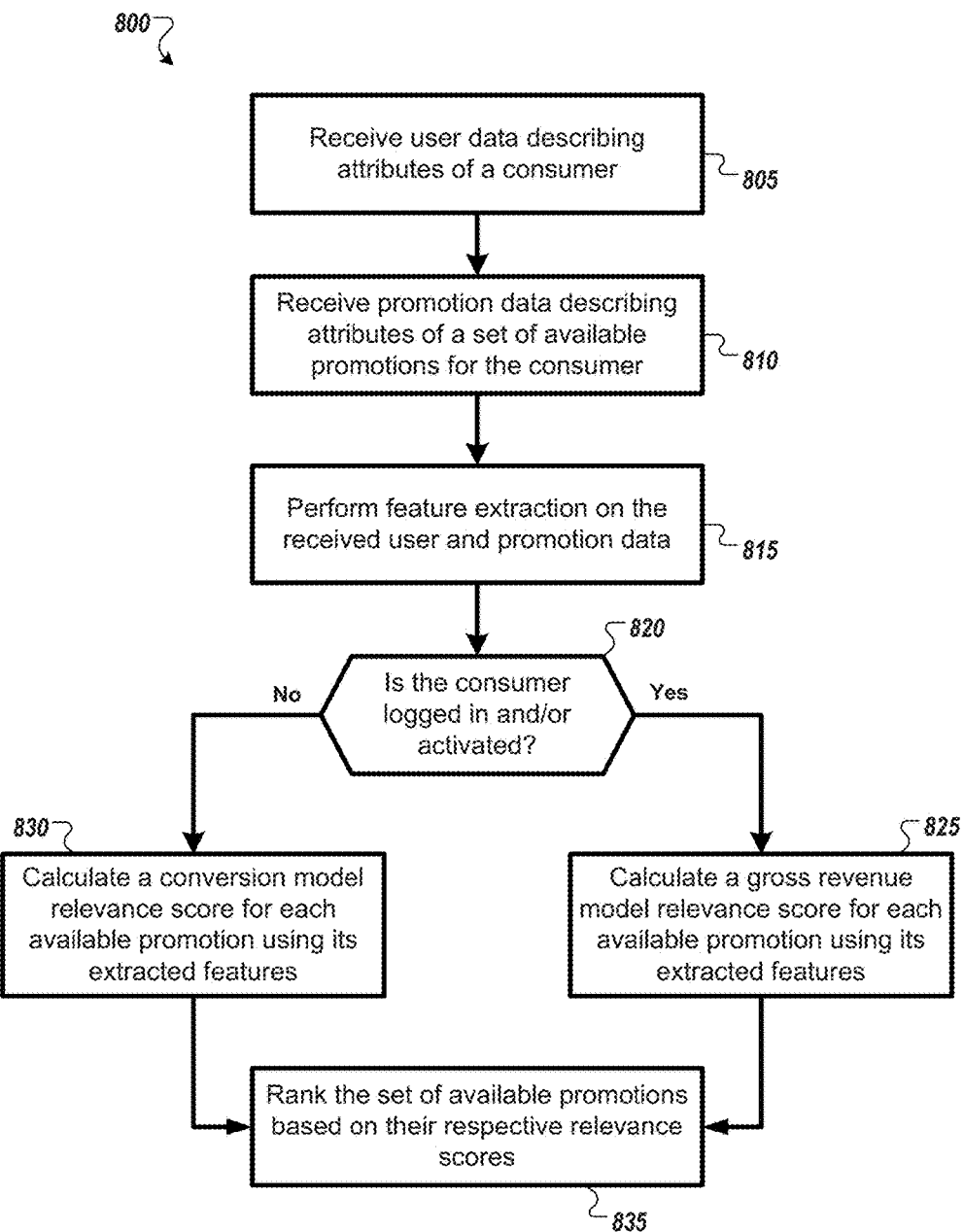
FIG. 8 is a flow diagram of an example method for generating and ranking a set of promotions to be recommended to a consumer using a relevance model that is determined based on the consumer lifecycle state in accordance with some embodiments discussed herein.

FIG. 8 is a flow diagram of an example method 800 for generating and ranking a set of promotions to be recommended to a consumer using a relevance model that is determined based on the consumer lifecycle state. For convenience, the method 800 will be described with respect to a system, including one or more computing devices, that performs the method 800. Specifically, the method 800 will be described with respect to its implementation within the workflow stages 340 in process 300.

In embodiments, the system receives 805 user data describing attributes of a consumer and receives 810 promotion data describing attributes of a set of available promotions for the consumer in the same way as previously described for steps 210 and 215 in method 200. In some embodiments, the received user data may include input data, as described for step 205 in method 200. In some embodiments, the received user data and received promotion data may include contextual data.

In embodiments, the system performs 815 feature extraction on the received user and promotion data, as previously described with reference to FIGS. 3 and 4.

In embodiments, the system determines 820 whether the consumer is logged in and/or activated based on the received user data. In an instance in which the consumer is determined to be logged in and/or activated, the system calculates 825 a gross revenue model relevance score for each of the set of available promotions based on a gross revenue predictive model using the extracted features. In an instance in which the consumer is determined not to be logged in and/or activated, the system calculates 830 a gross revenue model relevance score for each of the set of available promotions based on a conversion predictive model using the extracted features. In some embodiments, the system calculates the respective relevance scores of each of the set of available promotions using a combination random forest predictive model as described with reference to FIG. 7, and the selection of a the gross revenue predictive model or the conversion predictive model is implemented by executing exemplary logic 700.

In embodiments, the system ranks 835 the set of available promotions based on their respective relevance scores in the same way as previously described for step 225 in method 200.

Figure 9:
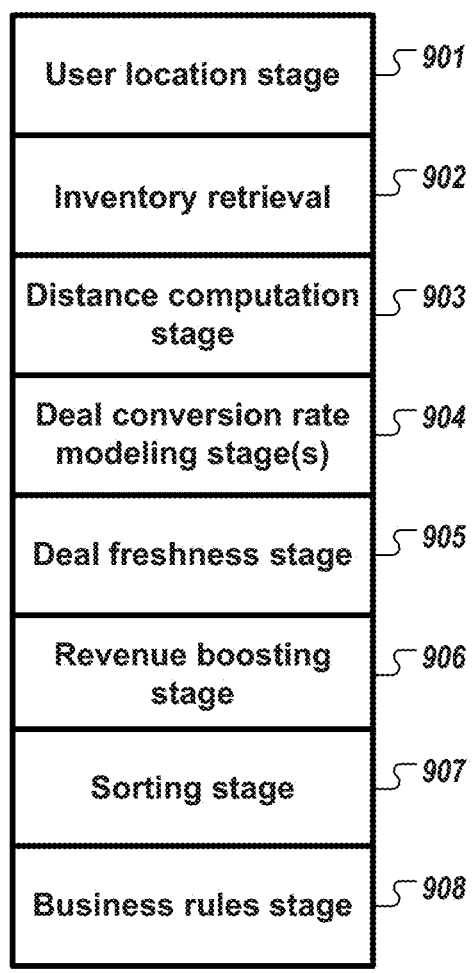
FIG. 9 is an illustration of an exemplary workflow for testing the performance of contextual relevance predictive models with some embodiments discussed herein.

FIG. 9 is an illustration of an exemplary workflow 900 for testing the performance of contextual relevance predictive models. In some embodiments, workflow 900 may be included in the workflow stages 340 of process 300, and implemented by recommendation engine 115. For clarity and without limitation, workflow 900 will be described with reference to embodiments implementing mobile relevance predictive modeling.

In embodiments, workflow 900 may be used to test predictive models based on features extracted from two contextual data sources: consumer locations (prior, current, or potential), and associated promotion categories of interest; and promotion subcategory consumer interest level. In embodiments, a mobile consumer's locations can be determined during the user location stage 901. Examples of a mobile consumer's prior, current, or potential locations may include:

home (prior)
work (prior)
device GPS (current)
downtown locations (or other hot spots) within the selected geographic region (potential)
locations of merchants for which the user has already purchased instruments (prior)

In general, each type of consumer location will be associated with one or more particular promotion categories. For example, a consumer who is planning a trip to Las Vegas is more likely to be interested in restaurants or tickets and less likely to be interested in duct cleaning or tire rotation. The consumer also is more likely to be interested in a promotion offered at a hot spot location (e.g., the Las Vegas "strip") than in a promotion offered at a location on the outskirts of town. Table 1 summarizes examples of suburb and travel use cases representing prior, current, or potential locations that can be associated with a mobile consumer.

TABLE 1

Mobile Suburb and Travel Use Cases

| home | GPS | selected place | hotspot | use case | relevant categories |
|---|---|---|---|---|---|
| Mountain View | Palo Alto | Santa Cruz | downtown Santa Cruz | weekend outing | restaurant, tickets |
| Mountain View | SeaTac | Seattle | Pioneer Square | traveling | restaurant, tickets |
| Mountain View | Palo Alto | San Jose | n/a | general interest | all |
| Mountain View | Palo Alto | Las Vegas | the "strip" | planning travel | restaurant, tickets |
| Mountain View | Palo Alto | New York | Times Square | planning travel | restaurant, tickets |

In embodiments, mobile suburb and travel predictive modeling may be tested, using workflow 900, in a combination of the user location stage 901, distance computation stage 902, and/or the sorting stage 907.

For example, in some embodiments, an experiment testing a mobile suburb and travel use case may be implemented as follows:

1. Use consumer places (home/work)+GPS lat/long for computing minimum distance to promotion (used for distance in relevance scoring)
2. If home/work is >16 miles from selected division center, and the promotion is restaurant/tickets/travel, then also include division center for computing minimum distance. If home/work is not known, then use GPS lat/long >16 miles from selected division center in previous logic.

3. Demote online promotions if selected division is not the user's home division (division closest to the user's home). If home is not known, then don't demote online promotions in any case.

One reason for demoting online promotions is that the consumer has demonstrated intent to see local promotions in a selected geographic region if the consumer explicitly selects a geographic region that is not close to home. Since the online promotions are national, the consumer will see them in any case without demotion when selecting their home region.

In embodiments, prior consumer promotion interest level may be considered a type of promotion "freshness" data feature that is based upon how many impressions of a promotion have been seen by a consumer so far (i.e., the more impressions of a promotion that have been seen by a consumer, the less fresh the promotion). A promotion determined to have lower promotion freshness is demoted in relevancy).

In embodiments, one or more promotion freshness data features may be determined in deal freshness stage 905. In some embodiments, freshness data also may include data indicating that the consumer is interested in purchasing the promotion (e.g., positive feedback signaled by a click on the impression and/or receiving a consumer request for a more detailed view of the promotion). In this case, a promotion that may have low freshness due to being shown in multiple previous impressions may be promoted due to the positive feedback from the consumer's prior promotion interest. In some embodiments, the freshness data feature is input into a mobile predictive model along with other key features (e.g., price, distance, purchase history, and DDO) so that the importance of the prior interest will be properly weighted taking into account the correlations with all the other features.

For example, consider the previous two impressions of a promotion shown to a consumer. If the consumer clicked on the promotion both times, then the prior interest level defined to be 2. If the consumer only clicked on the promotion the last time they saw the promotion, then the prior interest level is defined to be 1. If the consumer didn't click on the promotion for either of the previous two impressions, then the prior interest level is defined to be −2. If the consumer didn't click on the promotion just for the last time they saw the promotion, then define the prior interest level is defined to be −1. If the consumer didn't see the promotion yet, the prior interest level is defined to be 0.

In embodiments, experiments have demonstrated a strong correlation between conversion rate and the consumer's prior interest level, as measured in terms of prior consumer clicking on the promotion in previously shown impressions. If the consumer clicked on the promotion in the previous impression, then the conversion rate is about 10×. If the consumer has not seen the promotion yet, then the conversion rate is about a factor of 2 higher than if the consumer didn't click on the promotion for the last 2 impressions.

In some embodiments, prior promotion interest level may be tested as a replacement for the deal freshness stage 905 in exemplary workflow 900.

In embodiments, prior subcategory interest level is data feature representing whether a consumer previously has expressed interest in a particular promotion subcategory. Exemplary subcategory interest levels for a consumer include:
1. never purchased anything or not logged in
2. purchased something, but not in this category
3. purchased something in this category, but not in this subcategory
4. purchased something in this subcategory before In some embodiments, subcategory interest level can be incorporated into a conversion rate predicted by a mobile consumer lifecycle model (e.g., mobile consumer lifecycle model 600). In some embodiments, subcategory interest level may be tested by incorporating it into the promotion conversion rate modeling stages 904 in exemplary workflow 900.

For example, in embodiments, one million bcookies were sampled from North America over a particular time period. The bcookies were divided into two groups:
  holdout sample (5%). This group was used for ranking performance evaluation.
  training sample (95%). This group was used for training the ranking model.

All impressions, clicks, and purchases during a modeling time window were extracted from mobile logs generated during the particular time period. An exemplary set of data features used for a mobile consumer lifecycle model to be generated from the extracted data are summarized in Table 2.

TABLE 2

| Exemplary Mobile Model Data Features |
| --- |
| price |
| distance |
| email DDO, conversion rate at P1 |
| email DDO, conversion rate at P2-P5 |
| email DDO, gross revenue rate at P1 |
| email DDO, gross revenue rate at P2-P5 |
| mobile DDO, conversion rate at P1-P2 |
| mobile DDO, conversion rate at P3-P10 |
| category |
| hour of day |
| days since promotion launch |
| mobile device type |
| logged in or not |
| mobile engagement level |
| gender |
| subcategory engagement level |

In embodiments in which the predictive model that is generated based on the features is a combination random forest model (e.g., the random forest model described with reference to FIG. 7), the relative importance of the model features can be represented by computing the ensemble averaged depth weighted occurrence of each feature per random forest in the model.

A recommendation engine, e.g., recommendation engine 115 of system 100, may be considered a special case of search engine, where the query is implicitly "show me something interesting." While a search engine is expected to rank search results in order of relevance with the most relevant results at the top of the list, there is no expectation that the most relevant results returned from a search query will be relevant to the consumer in an absolute sense; e.g., a consumer could be querying for something unusual (e.g., a Brazilian restaurant), and the most relevant search result returned might not be as relevant to the consumer as when the consumer is querying for something common (e.g., pizza).

Recommendation engines are significantly different from search engines in that the consumer expects that the returned recommendations should be relevant in an absolute sense. Otherwise, the consumer will stop bothering to check in with the recommendation engine, or start ignoring any messaging from the recommendation engine. When irrelevant recommendations are issued, the consumer will regard this as "spam" even if some relevant recommendations are sprinkled among the irrelevant ones (think "the boy who cried wolf"). In embodiments, this general problem for marketing can be solved by implementing the concept of absolute relevance thresholding.

In embodiments, absolute relevance can be defined as an absolute prediction of a ranking target variable, e.g., the probability that the consumer will purchase a particular promotion, or the probability that the consumer will click on content within an impression that represents a particular promotion. Implementing absolute relevance thresholding raises the bar in terms of modeling methodology. For example, layered naive Bayes classifiers will, in general, start to lose absolute relevance prediction accuracy as the number of layered classifiers increases. Simple boost factors added to predictive models, which may solve a short term relevance problem, can completely erase absolute relevance prediction capabilities.

Figure 10:
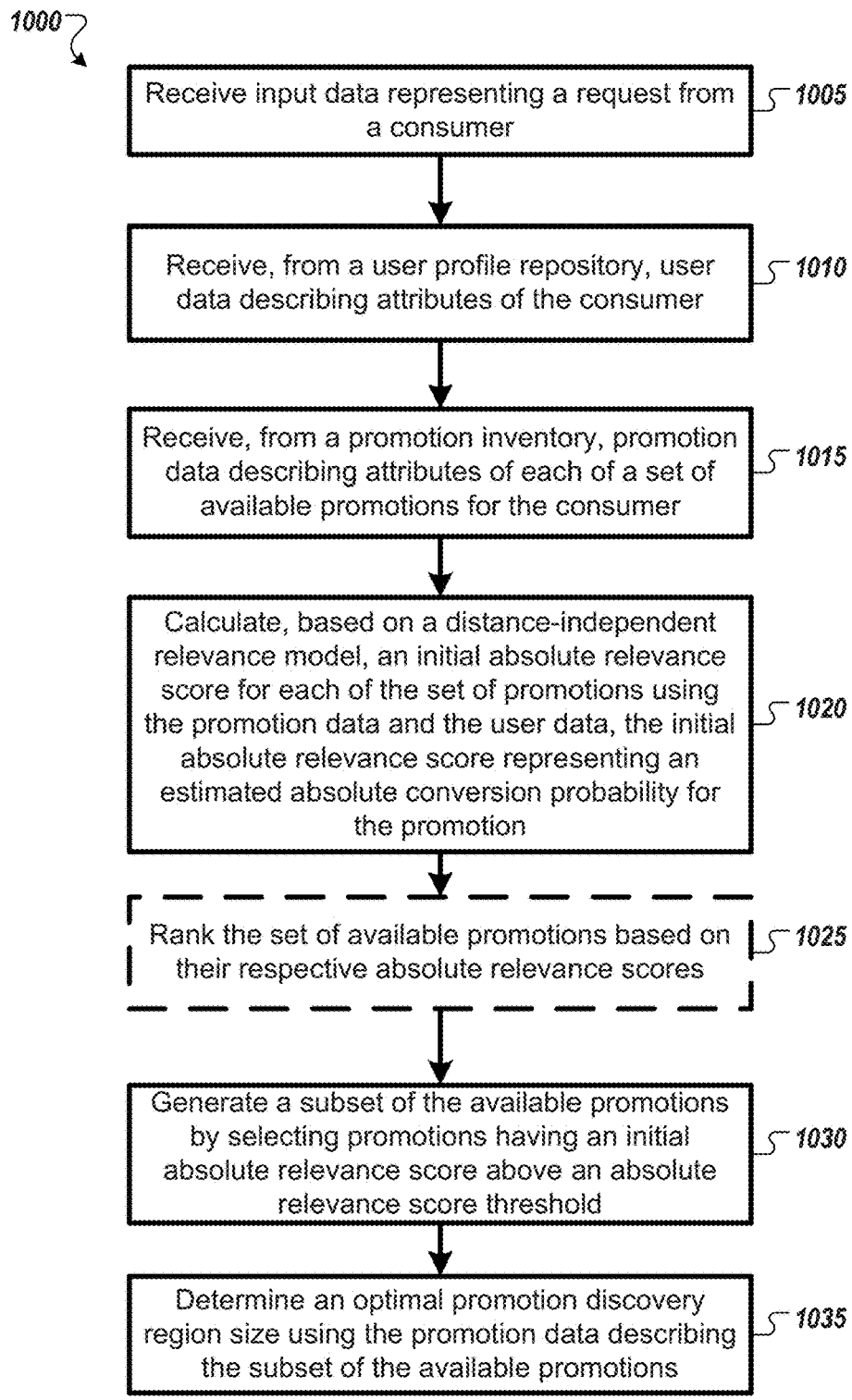
FIG. 10 is a flow diagram of an example method for using absolute relevance thresholding to optimize the discovery region for local promotions available to a consumer in accordance with some embodiments discussed herein.

FIG. 10 is a flow diagram of an example method 1000 for using absolute relevance thresholding to optimize the discovery region for local promotions available to a consumer. For convenience, the method 1000 will be described with respect to a system, including one or more computing devices, that performs the method 1000. Specifically, the method 1000 will be described with respect to its implementation within the workflow stages 340 in process 300. In embodiments, method 1000 may be implemented in an additional workflow stage for discovery region radius selection and associated promotion filtering.

In embodiments, optimizing the discovery region includes tuning the discovery region size to eliminate irrelevant promotions before applying more computationally intensive algorithms to rank available relevant promotions. In embodiments tuning the discovery region size may further include increasing the radius of local promotions to include if it is determined that not enough inventory of fresh promotions is very close to the consumer.

In embodiments, the system receives 1005 input data representing a request from a consumer, receives 1010 user data describing attributes of the consumer, and receives 1015 promotion data describing attributes of a set of available promotions for the consumer in the same way as previously described for steps 205, 210 and 215 in method 200. In some embodiments, the received user data and received promotion data may include contextual data.

In embodiments, the system calculates 1020, based on a distance-independent relevance model, an initial absolute relevance score for each of the set of available promotions using the promotion data and the user data. For example, in some embodiments, a distance-independent relevance model may be a single decision tree random forest model based on the features of prior consumer interest in the promotion, price, and days since promotion launch. In embodiments, the distance-independent model may be used to predict the absolute conversion probability for the set of available promotions early in a workflow before computing any distance features.

In some embodiments, the set of available promotions optionally are ranked 1025 based on their respective absolute relevance scores, and the system generates 1030 a subset of the available promotions by selecting promotions having an initial absolute relevance score above an absolute relevance threshold.

In embodiments, the system determines 1035 an optimal promotion discovery region size using the promotion data describing the subset of the available promotions. Determining the optimal promotion discovery region will be discussed in detail below with reference to FIGS. 11 and 12.

Figure 11:
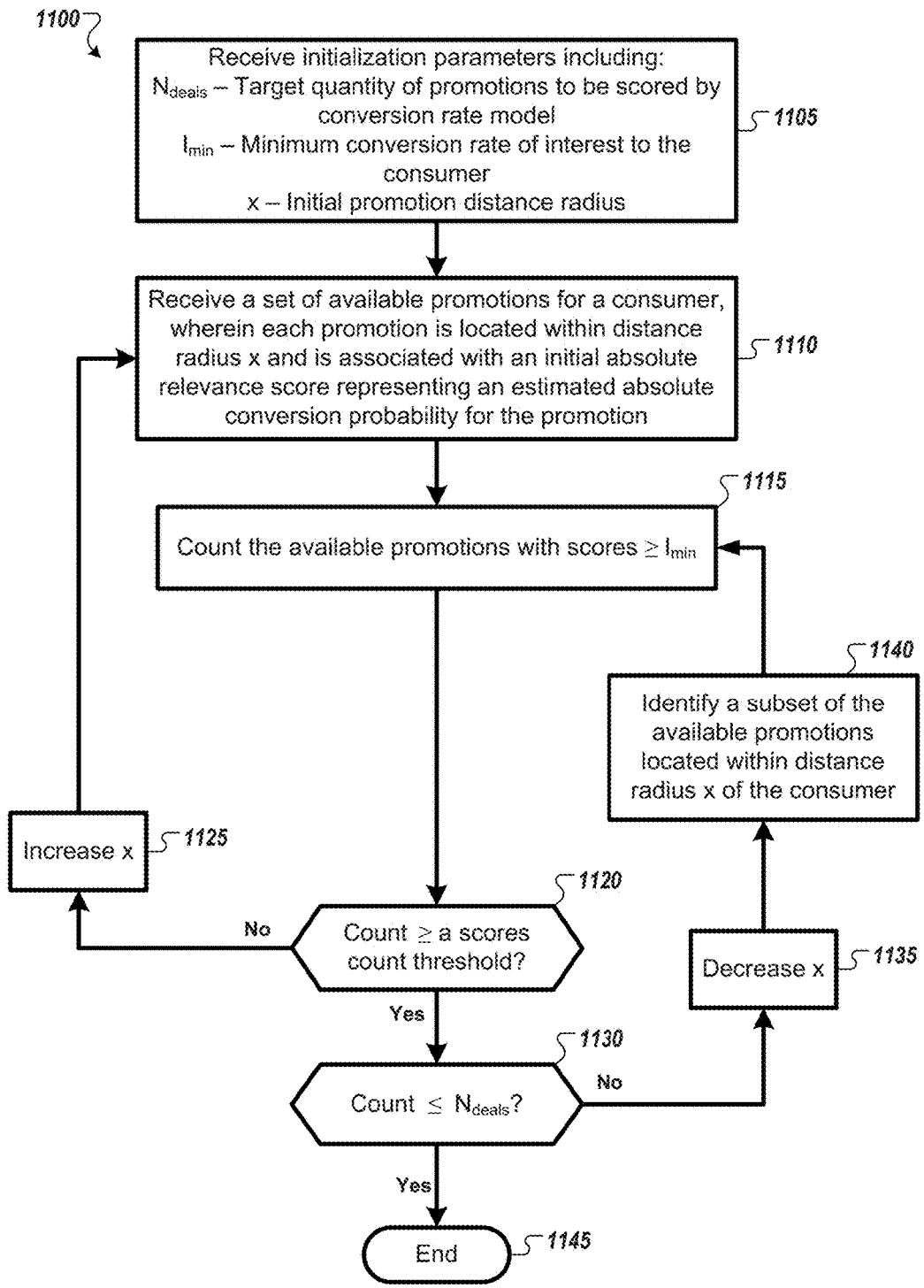
FIG. 11 is a flow diagram of an example method for optimizing promotion discovery region selection for local promotions available to a consumer in accordance with some embodiments discussed herein.

FIG. 11 is a flow diagram of an example method 1100 for optimizing promotion discovery region selection for local promotions available to a consumer. For convenience, the method 1100 will be described with respect to a system, including one or more computing devices, that performs the method 1100. Specifically, the method 1100 will be described with respect to its implementation within step 1030 of method 1000.

In embodiments, the system receives 1105 a set of initialization parameters: $N_{deals}$, a target quantity of deals to be scored during a workflow scoring stage (e.g., stage 344 in workflow stages 340 of process 300) using a conversion rate model within the discovery region (a quantity, e.g., 300, that is large enough to allow for a good browsing experience but small enough so that latency incurred by the scoring stage is below a maximum, e.g., 300 ms); $I_{min}$, a minimum threshold of conversion rate, e.g., 0.1%, considered to be interesting to the consumer within the discovery region; and x, an initial promotion distance radius, e.g., a radius that was used as a search criterion when extracting the initial set of available deals available to the consumer.

In embodiments, the system receives 1110 a set of available promotions for the consumer. Each of the set of promotions is located within the promotion distance radius x and is respectively associated with an initial absolute relevance score representing an estimated distance-independent absolute conversion probability for the promotion, as described with reference to step 1020 in method 1000.

In embodiments, the system calculates a count 1115 of the available promotions that are associated with an initial absolute relevance score greater than or equal to $I_{min}$. In embodiments, the system compares 1120 the count to a scores count threshold value.

In an instance in which the count is less than the scores count threshold value, the system increases 1125 the distance radius x to receive 1110 a new set of available promotions for the consumer, located within the increased distance radius x and each respectively associated with an initial absolute relevance score, and repeats steps 1115 and 1120. In some embodiments, the new set of available promotions is generated by implementing step 1020 of method 1000 in response to a notification that distance radius x has been increased.

In an instance in which the count is greater than or equal to the scores count threshold value, the system compares 1130 the count to $N_{deals}$.

In an instance in which the count is greater than $N_{deals}$, the system decreases 1135 distance radius x, identifies 1140 a subset of the available promotions that are located within decreased distance radius x, and repeats steps 1115 and 1120 using the identified subset of available promotions.

In an instance in which the count is less than or equal to $N_{deals}$, the process ends 1145.

Figure 12:
FIG. 12 illustrates exemplary local merchant discovery frontiers for two exemplary consumers in accordance with some embodiments discussed herein.

FIG. 12 illustrates exemplary local merchant discovery frontiers for two exemplary consumers. Consumer A lives in San Francisco, and Consumer B lives in Mountain View.

In embodiments, optimizing the discovery region for a consumer may include determining a personalized local merchant discovery frontier. As a consumer discovers more and more local merchants, the consumer typically will become knowledgeable about the merchants closest to them. At some point, a consumer will know all of the closest merchants, and the consumer's discovery frontier will move further away from home. Depending upon the consumer's location, e.g., suburb or city, the consumer's discovery frontier might be anywhere from a few miles away to many miles away. Referring to FIG. 12, consumer A in the city of San Francisco will have many local merchants to choose from, and therefore consumer A's discovery frontier may only be a few miles in size. On the other hand, consumer B in the Mountain View suburb may already know about all of the local merchants in Mountain View, and there may not be many other high quality merchants to discover even with a 10 mile radius. For this consumer, the discovery frontier could extend as far south as Santa Cruz, or as far north as San Francisco.

FIG. 13 illustrates an example 1300 of featured result set thresholding using absolute relevance. In embodiments, the optimum threshold for how many promotions to feature in an impression may be implemented using absolute relevance. For example, in some embodiments, an initial impression of available promotions is displayed to a consumer on a "feature tab" portion of the impression content display. Inclusion of a promotion in the feature tab will affect the impact of the impression of that promotion; the initial impressions a consumer sees encourage exploration of the rest of the content in general and are a driving factor for subsequent interactions with impressions.

In embodiments, a key parameter for the featured tab is how many promotions of what type to show on the tab. If too many promotions are shown, the consumer may never explore beyond the featured tab and thus miss out on relevant promotions. Conversely, if not enough of particular promotion types are shown, the consumer may not be interest enough to continue browsing promotions.

In some embodiments, the featured tab has fixed caps on numbers of various types of promotions (e.g., at most 5 goods promotions, at most 3 travel promotions, at most 3 promotions launched more than 7 days ago). Using absolute relevance thresholding, determination of how many promotions of what type to show on the featured tab for a particular consumer may be based on a personalized ranking of the available promotions for that consumer instead of using fixed caps, as in example 1300. In the example, calculations of the personalized ranking and threshold are based on an accurate prediction of the absolute conversion rate for a particular consumer for each of the available promotions, as implemented, for example, in method 1000.

Figure 14:
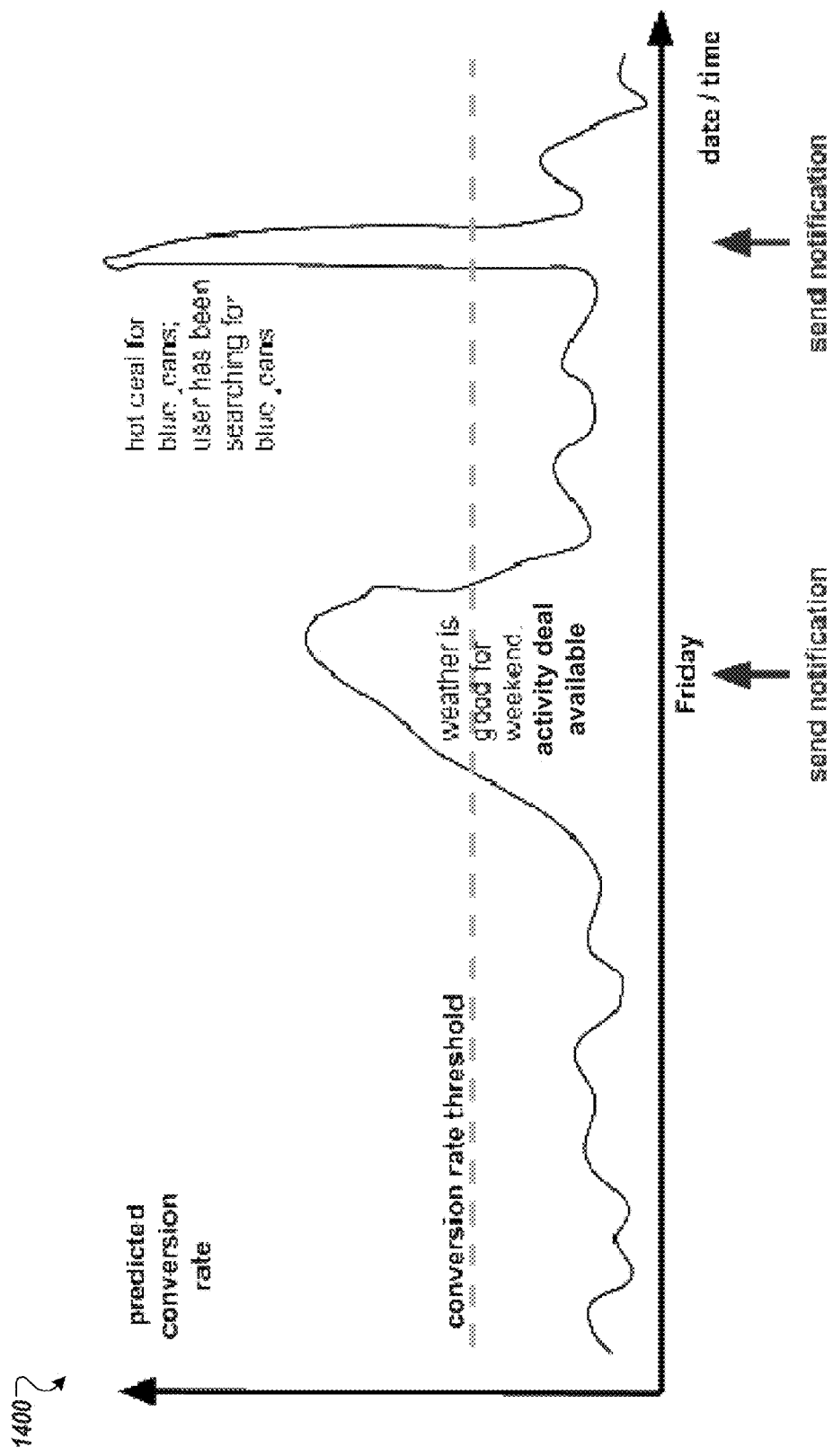
FIG. 14 illustrates and example of two personalized promotion notification triggers optimized for a consumer based on the consumer's predicted absolute conversion rates for a set of available promotions in accordance with some embodiments discussed herein.

FIG. 14 illustrates and example 1400 of two personalized promotion notification triggers optimized for a consumer based on the consumer's predicted absolute conversion rates for a set of available promotions.

In some embodiments, a consumer may receive notifications of available promotions based on absolute relevance. For example, the absolute relevance predictive model inputs may include the local weather, day of the week, promotion category, and consumer prior category and location interest (based on previously collected consumer behavior including clicks and/or purchases). The consumer receives a notification about an available promotion at the date/time when that consumer's predicted conversion rate for the promotion is above a conversion rate threshold, indicating that the consumer is more likely to purchase the promotion in response to the notification.

Turning to the example 1400, one notification about an activity promotion is sent to a consumer on the Friday before a weekend in which the weather will be good for performing the activity, while a second notification about an available promotion for blue jeans is sent to the consumer because the consumer's previous behavior includes searches for blue jeans.

Figure 15:
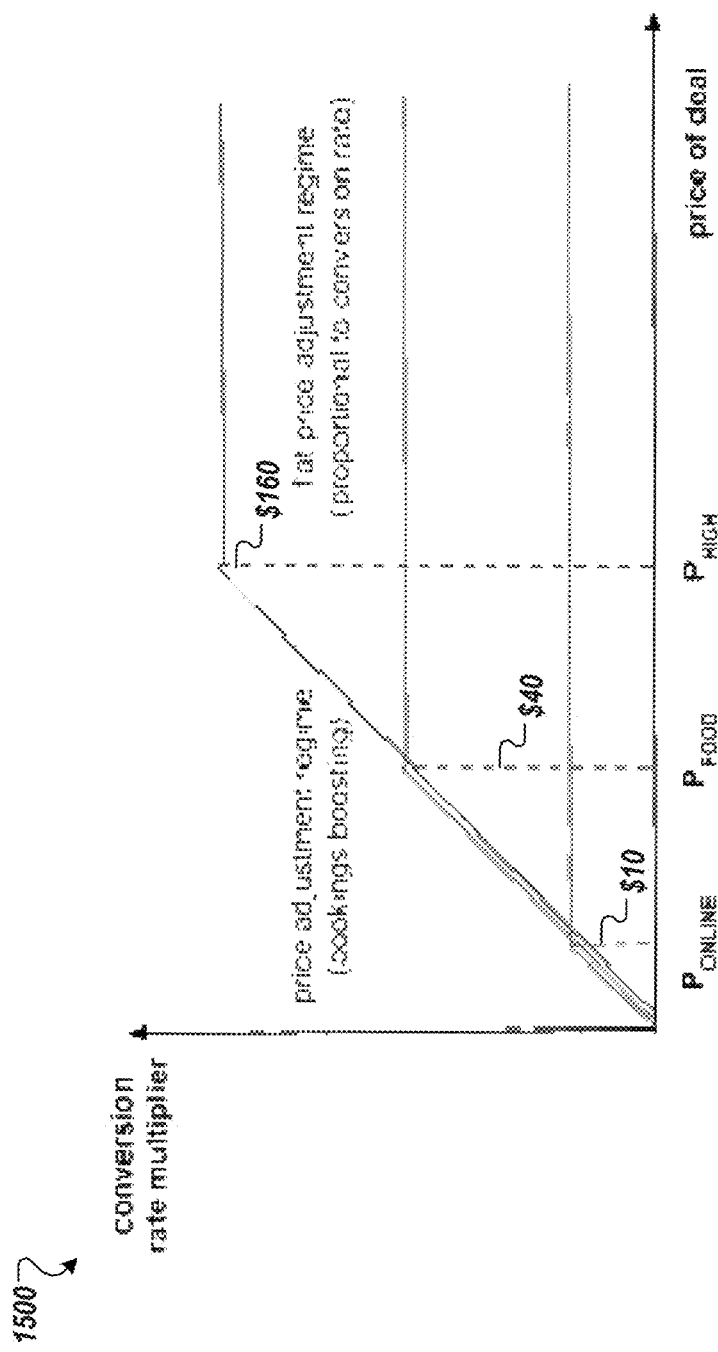
FIG. 15 illustrates an example of a category-dependent price boosting optimization for relevance scoring of promotions in accordance with some embodiments discussed herein.

FIG. 15 illustrates an example 1500 of a category-dependent price boosting optimization for relevance scoring of promotions. As discussed previously with reference to FIGS. 3 and 6-8, in some embodiments, predictive models can be based on gross revenue instead of conversion rate. In embodiments, a measure of gross revenue is bookings, defined as promotion price x conversion rate. In embodiments, it has been observed that there is degradation of both bookings and conversion rate for promotions if predictive model ranking targets are solely based on bookings. One explanation for this observation is that there are session level effects that render ineffective a simple per promotion optimization for bookings. When a consumer first engages with an impression (e.g., a mobile user first opens a mobile app containing promotion content), the consumer will be discouraged from continuing to browse through more promotion content in the impression if s/he doesn't see appealing promotions.

In this example, there are 3 category-dependent conversion rate multipliers, each of which is characterized by a price threshold: online ($P_{online}$): $10 price threshold; food ($P_{food}$): $40 price threshold; and other categories (e.g. travel, health, beauty, etc.) ($P_{high}$): $160 price threshold. Each of the category-dependent conversion rate multipliers is the promotion price, capped at the price threshold for that promotion's category. In embodiments, a promotion's relevance score, calculated based on a gross revenue model (i.e., bookings), can be optimized using a category-dependent multiplier for the promotion. In this case, where category-dependent multipliers are capped at a price threshold, the optimized relevance score can be interpreted to represent an estimated minimum quantity of bookings per impression for that promotion. Adding a price threshold to a category-dependent multiplier has the effect of suppressing promotions with prices above the threshold, while maximizing bookings of promotions having prices below the threshold. Typically, the top-ranked promotions for each category will cluster around the price threshold set for that category.

In embodiments, optimizing relevance scores using price boosting has the following advantages: the rough order of deal categories shown on the page can be determined based on the adjusted relevance scores; bookings below the price thresholds can be optimized automatically; and engagement above the price thresholds can be optimized automatically.

In embodiments, a price boosting optimization using the conversion rate multiplier is only applied to relevance scoring of promotions available to highly engaged consumers (e.g., see model state 610e in lifecycle model 600); promotions available to less engaged, disengaged, unactivated, or unlogged-in users do not have a price adjustment and therefore are scored using the basic conversion rate. This targeting of price boosting for scoring of promotions for consumers determined to be in particular lifecycle states enables automatic optimization both for activation of users who have not purchased yet, and for re-activation of those users who have become disengaged.

Figure 16:
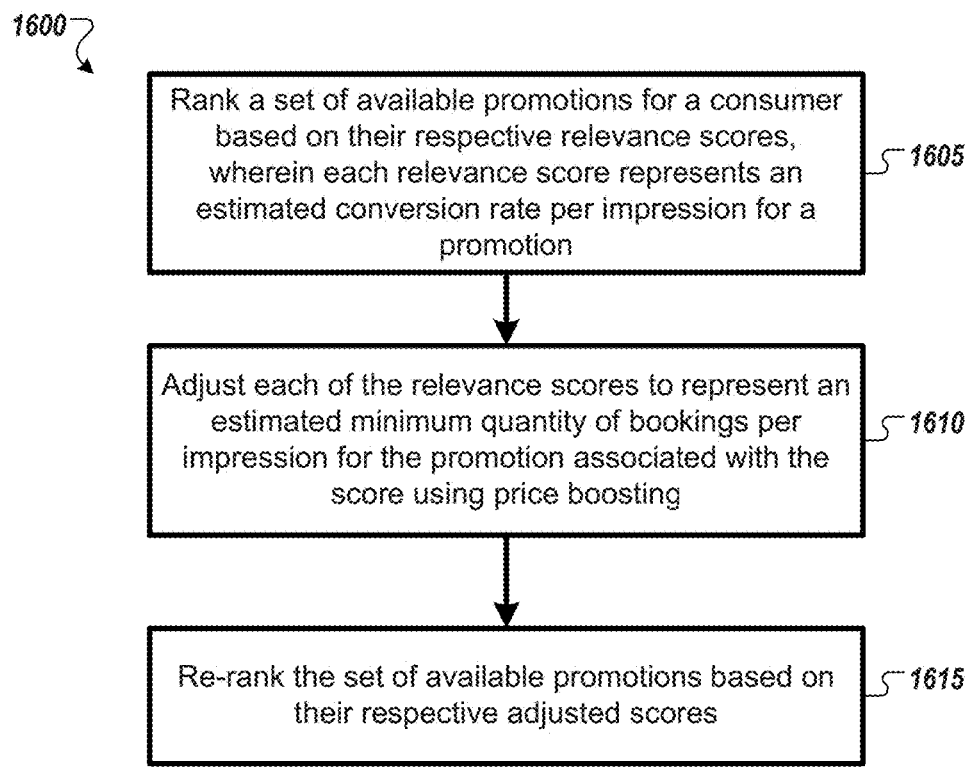
FIG. 16 is a flow diagram of an example method for using a price boosting optimization for relevance scoring of promotions in accordance with some embodiments discussed herein.

FIG. 16 is a flow diagram of an example method 1600 for using a price boosting optimization for relevance scoring of promotions. For convenience, the method 1600 will be described with respect to a system, including one or more computing devices, that performs the method 1600. Specifically, the method 1600 will be described with respect to its implementation within the workflow stage 906 in workflow 900.

In embodiments, the system ranks 1605 a set of available promotions for a consumer based on their respective relevance scores, with each relevance score representing an estimated conversion rate per impression for the promotion.

In embodiments, the system adjusts 1610 each of the calculated relevance scores to represent an estimated minimum quantity of bookings per impression for the promotion using price boosting, as discussed with reference to FIG. 15.

In embodiments, the system re-ranks 1615 the set of available promotions based on their respective adjusted scores.

Figure 17:
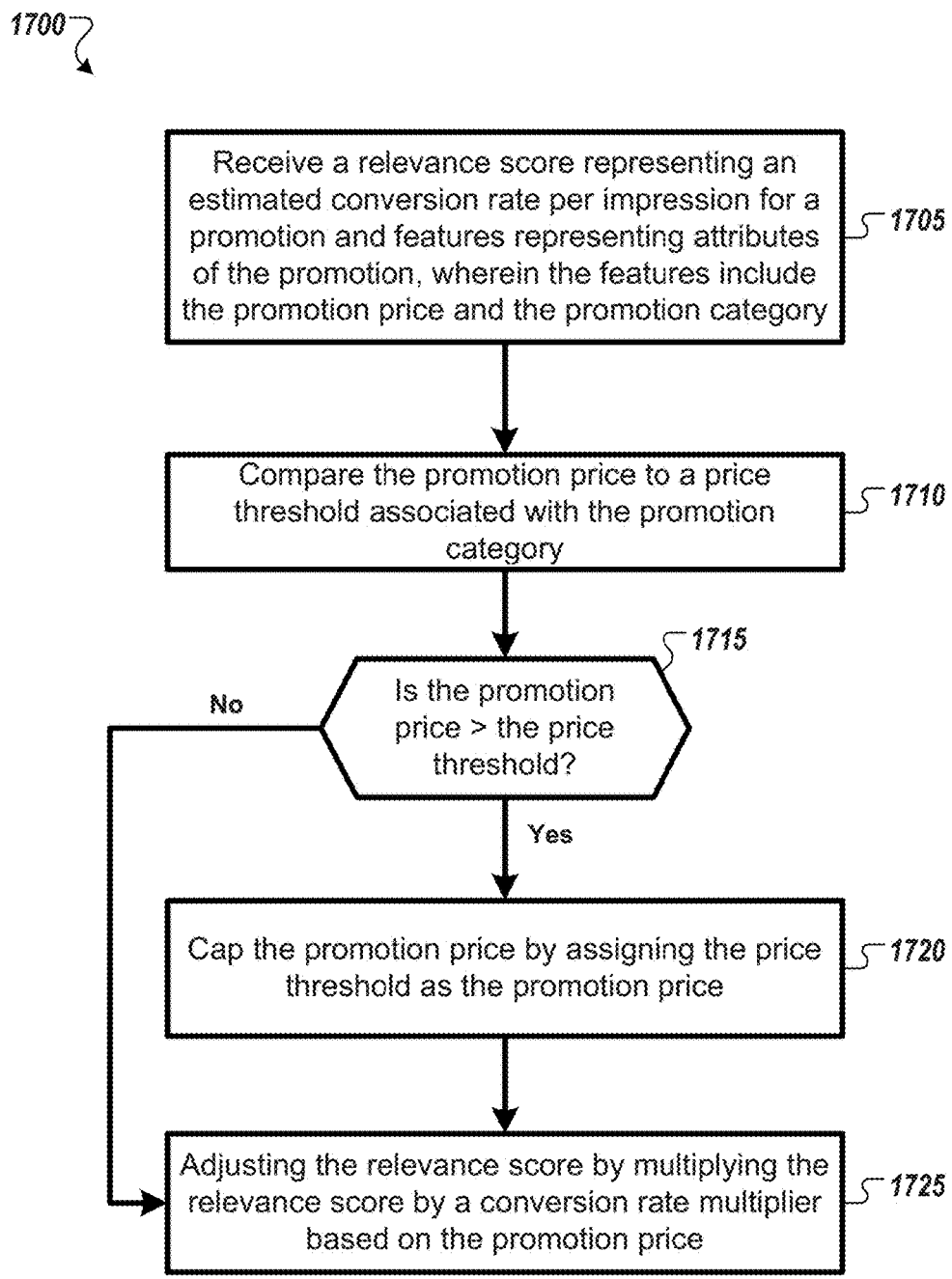
FIG. 17 is a flow diagram of an example method for adjusting a promotion relevance score using price boosting in accordance with some embodiments discussed herein.

FIG. 17 is a flow diagram of an example method 1700 for adjusting a promotion relevance score using price boosting. For convenience, the method 1700 will be described with respect to a system, including one or more computing devices, that performs the method 1700. Specifically, the method 1700 will be described with respect to its implementation within step 1610 of method 1600.

In embodiments, the system receives 1705 a relevance score representing an estimated conversion rate per impression for a promotion and features representing attributes of the promotion; the features including the promotion price and the promotion category.

In embodiments, the system compares 1710 the promotion price to a price threshold associated with the promotion category. In some embodiments, the price threshold is determined based on one or a combination of business strategy (e.g., calculated in business rules stage 908 of workflow 900) and/or attributes of promotion performance and/or consumer behavior. Business strategy is discussed in detail below with reference to FIG. 19. In some alternative embodiments, the price threshold is determined based on a set of configurable parameters, as discussed in detail below with reference to FIG. 18.

In an instance in which the promotion price is greater than the price threshold 1715, the system caps 1720 the promotion price by assigning the promotion price to be the price threshold. In an instance in which the promotion price is at or below the price threshold 1715, the system does not cap the promotion price.

In embodiments, the system calculates 1725 a conversion rate multiplier for the promotion by multiplying the relevance score by the promotion price.

Figure 18:
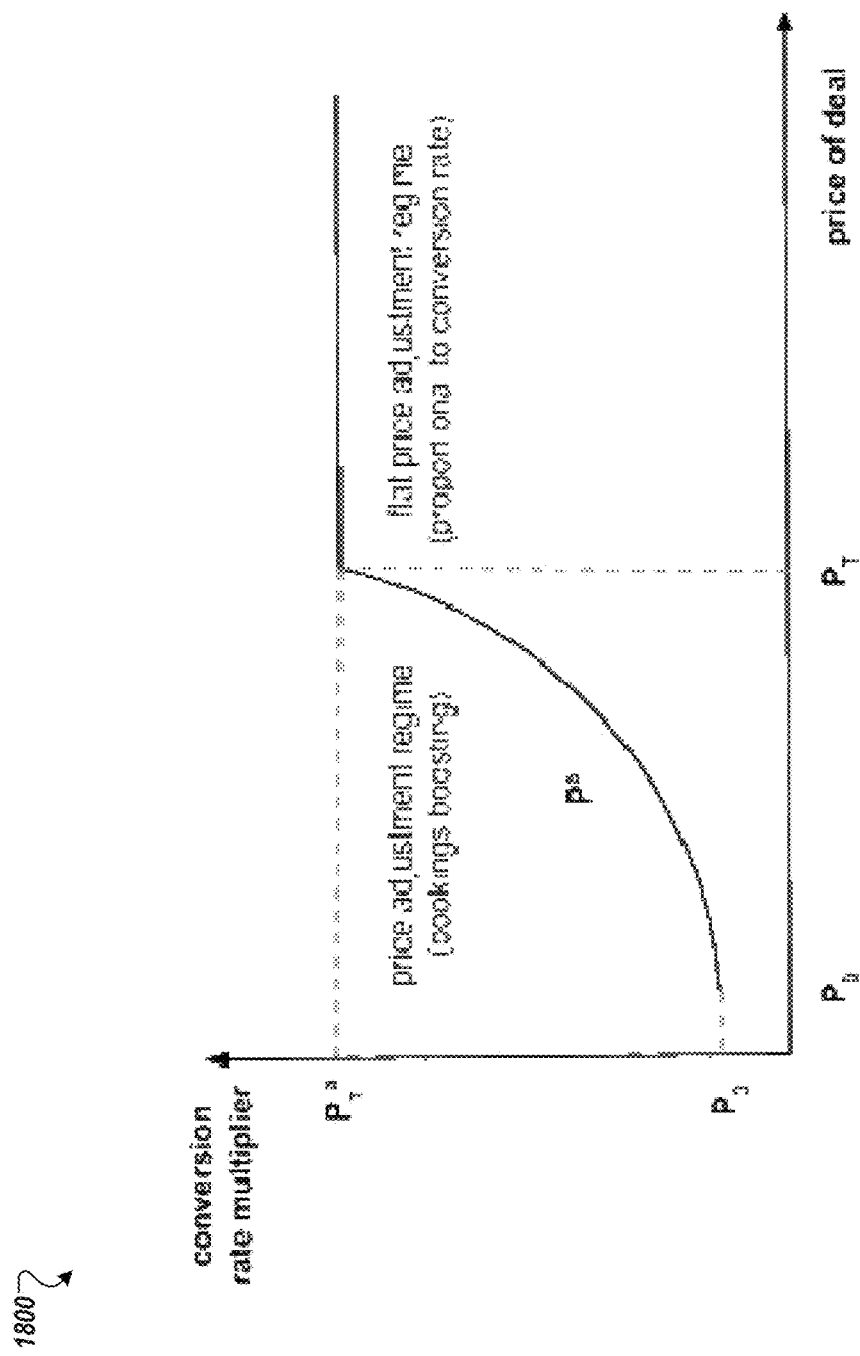
FIG. 18 illustrates an example of a second version of a price boosting optimization for relevance scoring of promotions in accordance with some embodiments discussed herein.

FIG. 18 illustrates an example 1800 of a second version of a price boosting optimization for relevance scoring of promotions. In example 1800, the conversion rate multiplier for a promotion is determined based on a set of configurable parameters instead of being determined based on a fixed category-dependent price threshold parameter (see, e.g., example 1600).

In example 1800, the configurable parameters are as follows: $P_T$ is the price point below which the price adjustment is applied to the conversion rate; $P_0$ is the lowest price point for the promotion category (e.g., in embodiments in which during feature extraction the price data are aggregated into bins, $P_0$ is the lowest price point bin), and a is a price exponent (in the special case of a=1, the bookings rate x the price exponent corresponds simply to the bookings rate and thus this version would be implemented in the same way as the version illustrated by example 1600).

Figure 19:
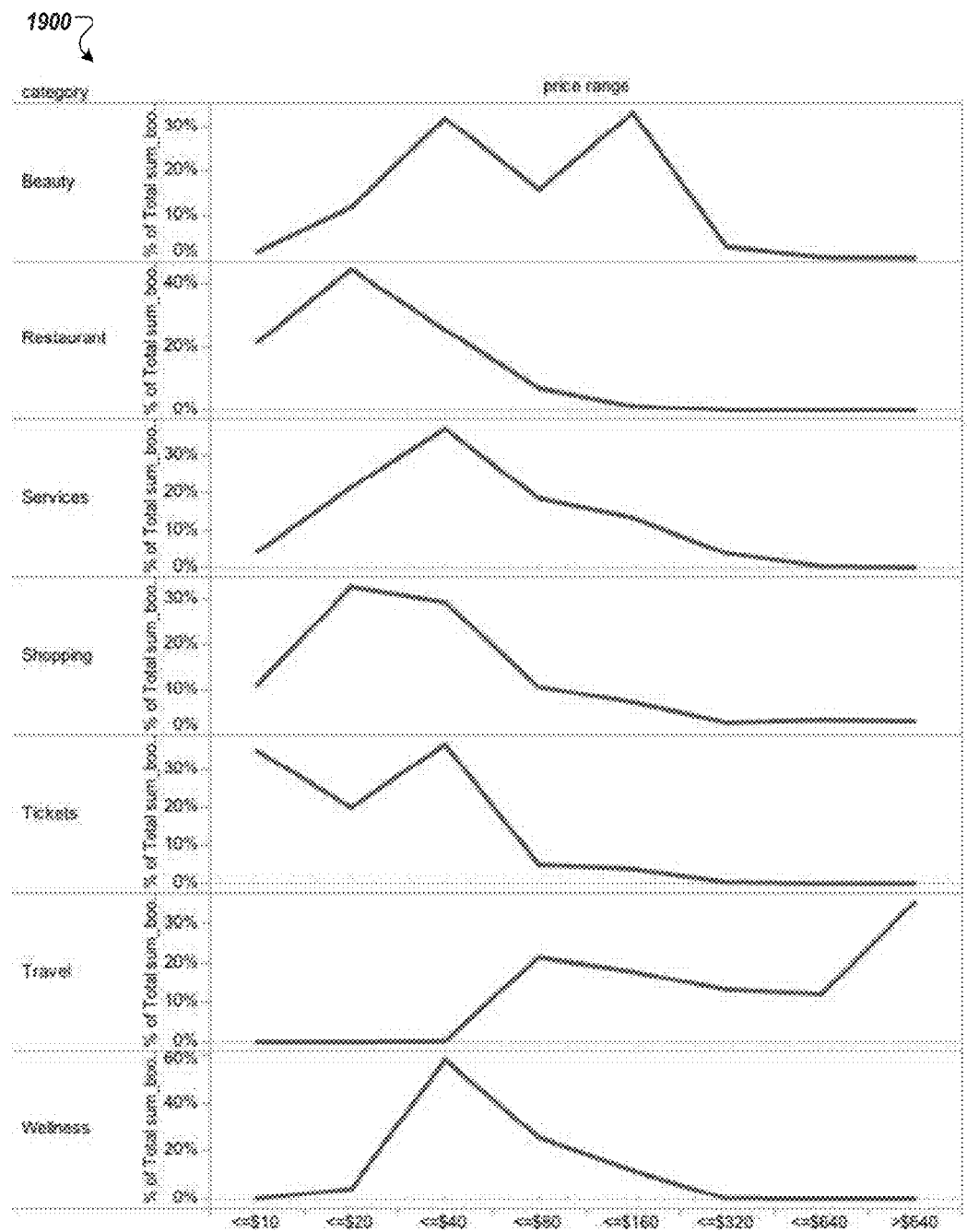
FIG. 19 is an exemplary chart that illustrates the distribution of bookings by price range for 7 promotion categories in accordance with some embodiments discussed herein.

FIG. 19 is an exemplary chart 1900 that illustrates the distribution of bookings by price range for 7 promotion categories. Each category has its own characteristic "sweet spot" price range for generating bookings (i.e., the price range for which the bookings generation peaks). In the example 1900, travel generates most bookings above $100 and actually peaks above $640. In contrast, shopping generates most bookings below $40 and peaks in the $10-$20 range. The ideal price threshold parameter value for a category should be close to the upper range of where the bulk of the bookings are generated for that category.

As described with reference to FIG. 17, determining the price threshold for a category may be based in part on business strategy. In embodiments, for example, a promotion and marketing service may wish to de-emphasize online promotions as a strategic decision to focus on promotions from local businesses. Since the bulk of the online promotions occur in the "shopping" category, the price threshold parameter for shopping is set at $10, which, as illustrated in example 1900, is below the ideal value for optimizing bookings for shopping. As a result, if category-dependent conversion rate multipliers are used to adjust the relevance scores of shopping promotions, the scores of the shopping promotions will be reduced, allowing other local promotions to be ranked higher when promotions of all categories are ranked. The higher rankings may enable the local promotions to have more prominence on the featured tab (e.g., see example 1300), which blends promotions from various categories.

In embodiments, the optimum set of price threshold parameters for a set of promotion categories can be determined based on data collected from live traffic. In some embodiments, the multi-dimensional price threshold parameter space can be sampled from multiple live user sessions by allowing a set of category parameters to vary randomly within a range around the initial values from every user session sampled. The optimum set of price threshold parameters can be measured and/or modeled based on the collected data. Thus, the ranking target function used as a predictive model would now be a session level variable, e.g., bookings per session instead of bookings per impression.

Figure 20:
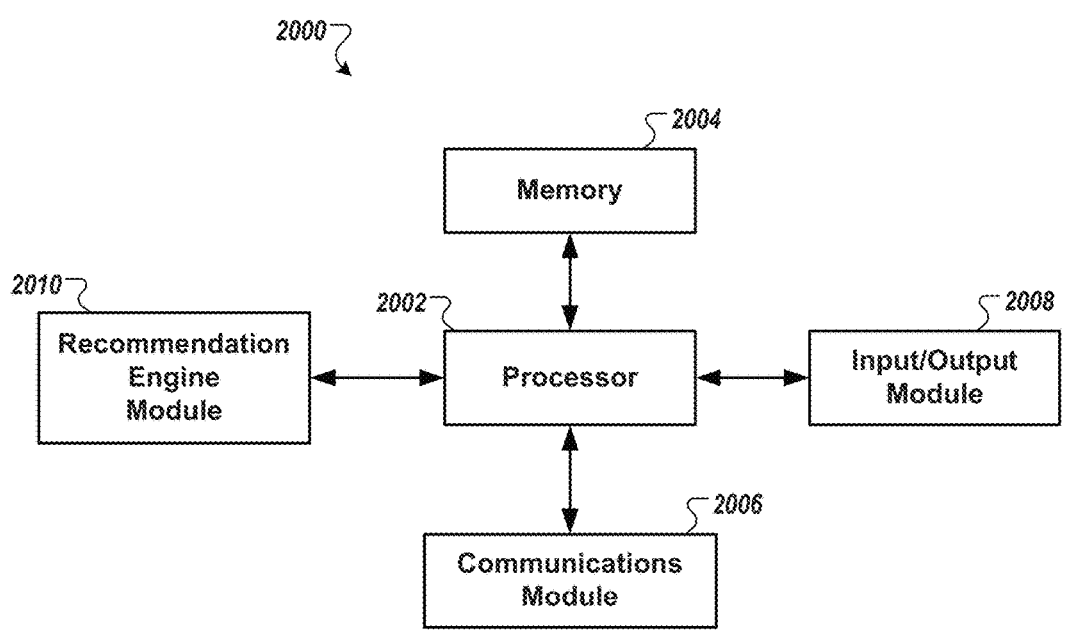
FIG. 20 illustrates a schematic block diagram of circuitry that can be included in a computing device, such as a recommendation engine, in accordance with some embodiments discussed herein.

FIG. 20 shows a schematic block diagram of circuitry 2000, some or all of which may be included in, for example, recommendation engine 115. As illustrated in FIG. 20, in accordance with some example embodiments, circuitry 2000 can include various means, such as processor 2002, memory 2004, communications module 2006, and/or input/output module 2008. As referred to herein, "module" includes hardware, software and/or firmware configured to perform one or more particular functions. In this regard, the means of circuitry 2000 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 2004) that is executable by a suitably configured processing device (e.g., processor 2002), or some combination thereof.

Processor 2002 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 20 as a single processor, in some embodiments, processor 2002 comprises a plurality of processors. The plurality of processors may be embodied on a single computing device or may be distributed across a plurality of computing devices collectively configured to function as circuitry 2000. The plurality of processors may be in operative communication with each other and may be collectively configured to perform one or more functionalities of circuitry 2000 as described herein. In an example embodiment, processor 2002 is configured to execute instructions stored in memory 2004 or otherwise accessible to processor 2002. These instructions, when executed by processor 2002, may cause circuitry 2000 to perform one or more of the functionalities of circuitry 2000 as described herein.

Whether configured by hardware, firmware/software methods, or by a combination thereof, processor 2002 may comprise an entity capable of performing operations according to embodiments of the present invention while configured accordingly. Thus, for example, when processor 2002 is embodied as an ASIC, FPGA or the like, processor 2002 may comprise specifically configured hardware for conducting one or more operations described herein. Alternatively, as another example, when processor 2002 is embodied as an executor of instructions, such as may be stored in memory 2004, the instructions may specifically configure processor 2002 to perform one or more algorithms and operations described herein, such as those discussed in connection with FIG. 1.

Memory 2004 may comprise, for example, volatile memory, non-volatile memory, or some combination thereof. Although illustrated in FIG. 20 as a single memory, memory 2004 may comprise a plurality of memory components. The plurality of memory components may be embodied on a single computing device or distributed across a plurality of computing devices. In various embodiments, memory 2004 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2004 may be configured to store information, data (including analytics data), applications, instructions, or the like for enabling circuitry 2000 to carry out various functions in accordance with example embodiments of the present invention. For example, in at least some embodiments, memory 2004 is configured to buffer input data for processing by processor 2002. Additionally or alternatively, in at least some embodiments, memory 2004 is configured to store program instructions for execution by processor 2002. Memory 2004 may store information in the form of static and/or dynamic information. This stored information may be stored and/or used by circuitry 2000 during the course of performing its functionalities.

Communications module 2006 may be embodied as any device or means embodied in circuitry, hardware, a computer program product comprising computer readable program instructions stored on a computer readable medium (e.g., memory 2004) and executed by a processing device (e.g., processor 2002), or a combination thereof that is configured to receive and/or transmit data from/to another device, such as, for example, a second circuitry 2000 and/or the like. In some embodiments, communications module 2006 (like other components discussed herein) can be at least partially embodied as or otherwise controlled by processor 2002. In this regard, communications module 2006 may be in communication with processor 2002, such as via a bus. Communications module 2006 may include, for example, an antenna, a transmitter, a receiver, a transceiver, network interface card and/or supporting hardware and/or firmware/software for enabling communications with another computing device. Communications module 2006 may be configured to receive and/or transmit any data that may be stored by memory 2004 using any protocol that may be used for communications between computing devices. Communications module 2006 may additionally or alternatively be in communication with the memory 2004, input/output module 2008 and/or any other component of circuitry 2000, such as via a bus.

Input/output module 2008 may be in communication with processor 2002 to receive an indication of a user input and/or to provide an audible, visual, mechanical, or other output to a user. Some example visual outputs that may be provided to a user by circuitry 2000 are discussed in connection with FIG. 1. As such, input/output module 2008 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 2000 is embodied as a server or database, aspects of input/output module 2008 may be reduced as compared to embodiments where circuitry 2000 is implemented as an end-user machine or other type of device designed for complex user interactions. In some embodiments (like other components discussed herein), input/output module 2008 may even be eliminated from circuitry 2000. Alternatively, such as in embodiments wherein circuitry 2000 is embodied as a server or database, at least some aspects of input/output module 2008 may be embodied on an apparatus used by a user that is in communication with circuitry 2000. Input/output module 2008 may be in communication with the memory 2004, communications module 2006, and/or any other component(s), such as via a bus. Although more than one input/output module and/or other component can be included in circuitry 2000, only one is shown in FIG. 20 to avoid overcomplicating the drawing (like the other components discussed herein).

Predictive recommendation engine module 2010 may also or instead be included and configured to perform the functionality discussed herein related to the recommendation engine discussed above. In some embodiments, some or all of the functionality of predictive recommendation engine may be performed by processor 2002. In this regard, the example processes and algorithms discussed herein can be performed by at least one processor 2002 and/or predictive recommendation engine module 2010. For example, non-transitory computer readable media can be configured to store firmware, one or more application programs, and/or other software, which include instructions and other computer-readable program code portions that can be executed to control each processor (e.g., processor 2002 and/or predictive recommendation engine module 2010) of the components of system 100 to implement various operations, including the examples shown above. As such, a series of computer-readable program code portions are embodied in one or more computer program products and can be used, with a computing device, server, and/or other programmable apparatus, to produce machine-implemented processes.

As described above in this disclosure, aspects of embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flow diagrams, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 2002 and/or predictive recommendation engine module 2010 discussed above with reference to FIG. 20, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 2004) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method, comprising:
    receiving, by a processor, input data representing a request for available promotions from a consumer device;
    receiving, by the processor, user data describing attributes of a consumer associated with the consumer device;
    receiving, by the processor, from a promotion inventory, promotion data describing attributes of a set of available promotions for the consumer;
    calculating, by the processor, a contextual relevance score for each of the set of promotions using at least one of the input data, the promotion data, and the user data, wherein the calculating is based on at least one relevance model, wherein the at least one relevance model is a predictive function;
    ranking, by the processor, the set of available promotions based on their respective contextual relevance scores; and
    presenting, by the processor and to the consumer device, a subset of the ranked set of available promotions, the subset of the ranked set of available promotions selected based on being a set of top-N promotions that are ranked highest in the ranked set of available promotions;
    wherein calculating, by the processor, the contextual relevance score for each of the set of promotions comprises:
    extracting features representing the input data, the promotion data, and the user data;
    determining the consumer's activation state; and
    in an instance in which the consumer is activated,
    calculating the contextual relevance score for each of the set of promotions using the features and a gross revenue relevance model.

2. The method of claim 1, wherein calculating, by the processor, the contextual relevance score for the promotion comprises:
    extracting features representing at least one of the input data, the promotion data, and the user data;
    generating a feature vector representing a set of the extracted features;
    mapping the feature vector, using the predictive function, to one of a set of probability classes, wherein each class represents a different probability that the feature vector matches a ranking target; and
    calculating the contextual relevance score using the probability class to which the feature vector was mapped.

3. The method of claim 1, wherein the predictive function is generated offline using supervised machine learning in a set of modeling stages in which the predictive function is adapted based on training data sets of features that are extracted from a set of data sources.

4. The method of claim 3, wherein the predictive function is generated based in part on at least one contextual data source, wherein the contextual data source is consumer locations (prior, current, or potential) and their associated categories of interest, prior promotion interest level shown by the consumer, or prior promotion subcategory interest level shown by the consumer.

5. The method of claim 1, wherein the predictive function is an ensemble of trees and a definition of the predictive function is represented in Predictive Model Markup Language (PMML).

6. The method of claim 1, further comprising:
    in an instance in which the consumer is not activated,
    calculating, by the processor, the contextual relevance score for each of the set of promotions using the features and a conversion rate relevance model.

7. A computer program product, encoded on a computer-readable medium, operable to cause a processor of data processing apparatus:
    receive input data representing a request for available promotions from a consumer device;
    receive user data describing attributes of a consumer associated with the consumer device;
    receive, from a promotion inventory, promotion data describing attributes of a set of available promotions for the consumer;

calculate a contextual relevance score for each of the set of promotions using at least one of the input data, the promotion data, and the user data, wherein the calculating is based on at least one relevance model, wherein the at least one relevance model is a predictive function;

rank the set of available promotions based on their respective contextual relevance scores; and present to the consumer device a subset of the ranked set of available promotions, the subset of the ranked set of available promotions selected based on being a set of top-N promotions that are ranked highest in the ranked set of available promotions;

wherein calculating the contextual relevance score for each of the set of promotions comprises:

extracting features representing the input data, the promotion data, and the user data;

determining the consumer's activation state; and in an instance in which the consumer is activated, calculating the contextual relevance score for each of the set of promotions using the features and a gross revenue relevance model.

8. The computer program product of claim 7, wherein calculating the contextual relevance score for the promotion comprises:

extracting features representing at least one of the input data, the promotion data, and the user data;

generating a feature vector representing a set of the extracted features;

mapping the feature vector, using the predictive function, to one of a set of probability classes, wherein each class represents a different probability that the feature vector matches a ranking target; and calculating the contextual relevance score using the probability class to which the feature vector was mapped.

9. The computer program product of claim 8, wherein the predictive function is generated offline using supervised machine learning in a set of modeling stages in which the predictive function is adapted based on training data sets of features that are extracted from a set of data sources.

10. The computer program product of claim 9, wherein the predictive function is generated based in part on at least one contextual data source, wherein the contextual data source is consumer locations (prior, current, or potential) and their associated categories of interest, prior promotion interest level shown by the consumer, or prior promotion subcategory interest level shown by the consumer.

11. The computer program product of claim 8, wherein the predictive function is an ensemble of trees, and a definition of the predictive function is represented in Predictive Model Markup Language (PMML).

12. The computer program product of claim 7, wherein the processor is further caused to:

in an instance in which the consumer is not activated, calculate the contextual relevance score for each of the set of promotions using the features and a conversion rate relevance model.

13. An apparatus comprising at least one processor and at least one memory including computer program code, the at least one memory and the computer program code configured to, with the at least one processor, cause the apparatus to:

receive input data representing a request for available promotions from a consumer device;

receive user data describing attributes of a consumer associated with the consumer device;

receive, from a promotion inventory, promotion data describing attributes of a set of available promotions for the consumer;

calculate a contextual relevance score for each of the set of promotions using at least one of the input data, the promotion data, and the user data, wherein the calculating is based on at least one relevance model, wherein the at least one relevance model is a predictive function;

rank the set of available promotions based on their respective contextual relevance scores; and present to the consumer device a subset of the ranked set of available promotions, the subset of the ranked set of available promotions selected based on being a set of top-N promotions that are ranked highest in the ranked set of available promotions;

wherein calculating the contextual relevance score for each of the set of promotions comprises:

extracting features representing the input data, the promotion data, and the user data;

determining the consumer's activation state; and in an instance in which the consumer is activated, calculating the contextual relevance score for each of the set of promotions using the features and a gross revenue relevance model.

14. The apparatus of claim 13, wherein calculating the contextual relevance score for the promotion comprises:

extracting features representing at least one of the input data, the promotion data, and the user data;

generating a feature vector representing a set of the extracted features;

mapping the feature vector, using the predictive function, to one of a set of probability classes, wherein each class represents a different probability that the feature vector matches a ranking target; and calculating the contextual relevance score using the probability class to which the feature vector was mapped.

15. The apparatus of claim 14, wherein the predictive function is generated offline using supervised machine learning in a set of modeling stages in which the predictive function is adapted based on training data sets of features that are extracted from a set of data sources.

16. The apparatus of claim 15, wherein the predictive function is generated based in part on at least one contextual data source, wherein the contextual data source is consumer locations (prior, current, or potential) and their associated categories of interest, prior promotion interest level shown by the consumer, or prior promotion subcategory interest level shown by the consumer.

17. The apparatus of claim 14, wherein the predictive function is an ensemble of trees, and a definition of the predictive function is represented in Predictive Model Markup Language (PMML).

18. The apparatus of claim 17, wherein the predictive function definition represented in the Predictive Model Markup Language (PMML) is created from an input model configuration using R application.

19. The apparatus of claim 17 wherein the predictive function definition is a file comprising one or more Predictive Model Markup Language (PMML) model definitions and a decision tree for use in selecting a predictive model definition from the one or more Predictive Model Markup Language (PMML) model definitions.

20. The apparatus of claim 19, wherein the file is a JavaScript Object Notation (JASON) file.

21. The apparatus of claim 17, wherein the predictive function includes multiple random forest models, each representing a different contextual data source.

22. The apparatus of claim 13, wherein the at least one memory and the computer program code configured to, with the at least one processor, further cause the apparatus to:
   in an instance in which the consumer is not activated, calculate the contextual relevance score for each of the set of promotions using the features and a conversion rate relevance model.

* * * * *